United States Patent
Westbrook et al.

(10) Patent No.: US 9,414,127 B2
(45) Date of Patent: *Aug. 9, 2016

(54) SYSTEM FOR REMOTELY CONTROLLING CLIENT RECORDING AND STORAGE BEHAVIOR

(71) Applicant: TiVo Inc., Alviso, CA (US)

(72) Inventors: Paul Westbrook, San Jose, CA (US); Howard Look, Palo Alto, CA (US); James Young, Livermore, CA (US); Stephen Lacy, Mountain View, CA (US); Timothy Davison, San Francisco, CA (US); James M. Barton, Alviso, CA (US)

(73) Assignee: TiVo Inc., Alviso, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/799,497

(22) Filed: Jul. 14, 2015

(65) Prior Publication Data

US 2016/0014472 A1    Jan. 14, 2016

Related U.S. Application Data

(63) Continuation of application No. 13/686,806, filed on Nov. 27, 2012, now Pat. No. 9,083,941, which is a continuation of application No. 12/806,661, filed on Aug. 17, 2010, now Pat. No. 8,321,901, which is a (Continued)

(51) Int. Cl.
*H04N 7/173* (2011.01)
*H04N 21/6543* (2011.01)
(Continued)

(52) U.S. Cl.
CPC ............. *H04N 21/6543* (2013.01); *H04N 5/76* (2013.01); *H04N 5/765* (2013.01); *H04N 5/782* (2013.01);
(Continued)

(58) Field of Classification Search
CPC .................................................. H04N 5/44543
USPC ........................................................... 725/116
See application file for complete search history.

(56) References Cited

U.S. PATENT DOCUMENTS 4,600,989 A    7/1986  Schwartz et al.
4,706,121 A    11/1987 Young
(Continued)

FOREIGN PATENT DOCUMENTS

EP    0 435 370 B1    3/1994
EP    0 774 866 A2    5/1997
(Continued)

OTHER PUBLICATIONS

U.S. Appl. No. 13/732,411, filed Jan. 1, 2013, Non-Final Office Action.

(Continued)

*Primary Examiner* — Hunter B Lonsberry
(74) *Attorney, Agent, or Firm* — Wong & Rees LLP; Karl T. Rees

(57) ABSTRACT

A system for remotely controlling client recording and storage behavior schedules the recording, storing, and deleting of multimedia content on a client system storage device. The viewer may request that certain content be captured. Capture requests also allow the service to determine content to be recorded by the client system in the same manner that a viewer requests that certain content are recorded but are more powerful than what a viewer can request. Recording requests for a capture request can preempt viewer requests or be entered at the same or lower priority as a viewer request. Capture requests can adjust all aspects of a recording request and affect the capture request itself. Client system operational functionality are also manipulated by the service using capture requests.

30 Claims, 13 Drawing Sheets

Scheduling a Recording

Related U.S. Application Data continuation of application No. 12/360,102, filed on Jan. 26, 2009, now Pat. No. 7,779,446, which is a continuation of application No. 10/339,700, filed on Jan. 8, 2003, now Pat. No. 7,543,325, which is a continuation-in-part of application No. 09/422,121, filed on Oct. 20, 1999, now Pat. No. 7,665,111.

(60) Provisional application No. 60/347,181, filed on Jan. 8, 2002, provisional application No. 60/127,178, filed on Mar. 30, 1999.

(51) Int. Cl.
| | |
|---|---|
| H04N 21/218 | (2011.01) |
| H04N 21/466 | (2011.01) |
| H04N 5/76 | (2006.01) |
| H04N 5/765 | (2006.01) |
| H04N 5/782 | (2006.01) |
| H04N 7/025 | (2006.01) |
| H04N 7/16 | (2011.01) |
| H04N 21/4147 | (2011.01) |
| H04N 21/433 | (2011.01) |
| H04N 21/4335 | (2011.01) |
| H04N 21/442 | (2011.01) |
| H04N 21/45 | (2011.01) |
| H04N 21/472 | (2011.01) |
| H04N 21/475 | (2011.01) |
| H04N 5/91 | (2006.01) |
| H04N 21/24 | (2011.01) |
| H04N 21/458 | (2011.01) |
| H04N 21/462 | (2011.01) |

(52) U.S. Cl.
CPC .............. *H04N 5/91* (2013.01); *H04N 7/025* (2013.01); *H04N 7/162* (2013.01); *H04N 21/2181* (2013.01); *H04N 21/2407* (2013.01); *H04N 21/4147* (2013.01); *H04N 21/4331* (2013.01); *H04N 21/4334* (2013.01); *H04N 21/4335* (2013.01); *H04N 21/44222* (2013.01); *H04N 21/458* (2013.01); *H04N 21/4516* (2013.01); *H04N 21/4532* (2013.01); *H04N 21/466* (2013.01); *H04N 21/4622* (2013.01); *H04N 21/4667* (2013.01); *H04N 21/4755* (2013.01); *H04N 21/47214* (2013.01)

(56) References Cited

U.S. PATENT DOCUMENTS

| | | | |
|---|---|---|---|
| 4,977,455 | A | 12/1990 | Young |
| 5,027,400 | A | 6/1991 | Baji et al. |
| 5,034,902 | A | 7/1991 | Steinmann |
| 5,038,211 | A | 8/1991 | Hallenbeck |
| 5,063,547 | A | 11/1991 | Custers et al. |
| 5,121,476 | A | 6/1992 | Yee |
| 5,175,631 | A | 12/1992 | Juri et al. |
| 5,247,364 | A | 9/1993 | Banker et al. |
| 5,307,173 | A | 4/1994 | Yuen et al. |
| 5,335,079 | A | 8/1994 | Yuen et al. |
| 5,353,121 | A | 10/1994 | Young et al. |
| 5,502,504 | A | 3/1996 | Marshall et al. |
| 5,515,173 | A | 5/1996 | Mankovitz et al. |
| 5,566,271 | A | 10/1996 | Tomitsuka et al. |
| 5,585,838 | A | 12/1996 | Lawler et al. |
| 5,596,373 | A | 1/1997 | White et al. |
| 5,619,247 | A | 4/1997 | Russo |
| 5,640,453 | A | 6/1997 | Schuchman et al. |
| 5,648,824 | A | 7/1997 | Dunn et al. |
| 5,701,383 | A | 12/1997 | Russo et al. |
| 5,710,601 | A | 1/1998 | Marshall et al. |
| 5,734,444 | A | 3/1998 | Yoshinobu |
| 5,745,710 | A | 4/1998 | Clanton et al. |
| 5,758,257 | A | 5/1998 | Herz et al. |
| 5,758,259 | A | 5/1998 | Lawler |
| 5,774,664 | A | 6/1998 | Hidary et al. |
| 5,790,198 | A | 8/1998 | Roop et al. |
| 5,793,438 | A | 8/1998 | Bedard |
| 5,801,747 | A | 9/1998 | Bedard |
| 5,801,787 | A | 9/1998 | Schein et al. |
| 5,805,235 | A | 9/1998 | Bedard |
| 5,805,763 | A | 9/1998 | Lawler et al. |
| 5,809,204 | A | 9/1998 | Young et al. |
| 5,818,441 | A | 10/1998 | Throckmorton et al. |
| 5,828,945 | A | 10/1998 | Klosterman |
| 5,835,911 | A | 11/1998 | Nakagawa et al. |
| 5,850,218 | A | 12/1998 | LaJoie et al. |
| 5,861,906 | A | 1/1999 | Dunn et al. |
| 5,872,588 | A | 2/1999 | Aras et al. |
| 5,878,186 | A | 3/1999 | Bennett et al. |
| 5,878,222 | A | 3/1999 | Harrison |
| 5,907,322 | A | 5/1999 | Kelly et al. |
| 5,923,362 | A | 7/1999 | Klosterman |
| 5,940,073 | A | 8/1999 | Klosterman et al. |
| 5,959,688 | A | 9/1999 | Schein et al. |
| 5,991,799 | A | 11/1999 | Yen |
| 6,002,394 | A | 12/1999 | Schein et al. |
| 6,012,086 | A | 1/2000 | Lowell |
| 6,028,600 | A | 2/2000 | Rosin et al. |
| 6,029,195 | A | 2/2000 | Herz |
| 6,061,503 | A | 5/2000 | Chamberlain |
| 6,177,931 | B1 | 1/2001 | Alexander et al. |
| 6,208,799 | B1 | 3/2001 | Marsh et al. |
| 6,209,132 | B1 | 3/2001 | Harrison et al. |
| 6,229,532 | B1 | 5/2001 | Fujii |
| 6,243,741 | B1 | 6/2001 | Utsumi |
| 6,260,192 | B1 | 7/2001 | Rosin et al. |
| 6,288,716 | B1 | 9/2001 | Humpleman et al. |
| 6,292,624 | B1 | 9/2001 | Saib et al. |
| 6,317,722 | B1 | 11/2001 | Jacobi et al. |
| 6,324,338 | B1 | 11/2001 | Wood et al. |
| 6,344,878 | B1 | 2/2002 | Emura |
| 6,374,406 | B2 | 4/2002 | Hirata |
| 6,400,407 | B1 | 6/2002 | Zigmond et al. |
| 6,400,996 | B1 | 6/2002 | Hoffberg et al. |
| 6,412,112 | B1 | 6/2002 | Barrett |
| 6,425,128 | B1 | 7/2002 | Krapf et al. |
| 6,442,598 | B1 | 8/2002 | Wright et al. |
| 6,481,011 | B1 | 11/2002 | Lemmons |
| 6,493,876 | B1 | 12/2002 | DeFreese et al. |
| 6,507,951 | B1 | 1/2003 | Wugofski |
| 6,522,342 | B1 | 2/2003 | Gagnon et al. |
| 6,532,589 | B1 | 3/2003 | Proehl et al. |
| 6,594,682 | B2 | 7/2003 | Peterson et al. |
| 6,614,987 | B1 | 9/2003 | Ismail et al. |
| 6,654,546 | B1 | 11/2003 | Levin et al. |
| 6,658,663 | B1 | 12/2003 | Bruynsteen |
| 6,675,388 | B1 | 1/2004 | Beckmann et al. |
| 6,698,020 | B1 | 2/2004 | Zigmond et al. |
| 6,718,551 | B1 | 4/2004 | Swix et al. |
| 6,721,954 | B1 | 4/2004 | Nickum |
| 6,725,281 | B1 | 4/2004 | Zintel et al. |
| 6,757,691 | B1 | 6/2004 | Welsh et al. |
| 6,898,762 | B2 | 5/2005 | Ellis et al. |
| 6,993,721 | B2 | 1/2006 | Rosin et al. |
| 7,003,790 | B1 | 2/2006 | Inoue et al. |
| 7,046,911 | B2 | 5/2006 | Zimmerman et al. |
| 7,124,431 | B2 | 10/2006 | Hanai et al. |
| 7,224,886 | B2 | 5/2007 | Akamatsu et al. |
| 7,543,325 | B2 | 6/2009 | Westbrook et al. |
| 8,316,389 | B2 | 11/2012 | Wong et al. |
| 8,943,527 | B2 | 1/2015 | Ghashghai et al. |
| 9,083,941 | B2 * | 7/2015 | Westbrook ............... H04N 5/76 |
| 2001/0046366 | A1 | 11/2001 | Susskind |
| 2001/0053274 | A1 | 12/2001 | Roelofs et al. |
| 2002/0046407 | A1 | 4/2002 | Franco |
| 2002/0049635 | A1 | 4/2002 | Mai et al. |
| 2002/0054752 | A1 | 5/2002 | Wood et al. |
| 2002/0056087 | A1 | 5/2002 | Berezowski et al. |
| 2002/0073424 | A1 | 6/2002 | Ward et al. |
| 2002/0083153 | A1 | 6/2002 | Sweatt et al. |

(56) References Cited

U.S. PATENT DOCUMENTS

| | | | |
|---|---|---|---|
| 2002/0083459 | A1 | 6/2002 | Kondo et al. |
| 2002/0108113 | A1 | 8/2002 | Schaffer et al. |
| 2002/0110360 | A1 | 8/2002 | Potrebic |
| 2002/0199194 | A1 | 12/2002 | Ali |
| 2003/0037333 | A1 | 2/2003 | Ghashghai et al. |
| 2003/0154477 | A1 | 8/2003 | Hassell et al. |
| 2003/0158958 | A1 | 8/2003 | Chiu |
| 2003/0182567 | A1 | 9/2003 | Barton et al. |
| 2003/0204613 | A1 | 10/2003 | Hudson et al. |
| 2004/0008289 | A1 | 1/2004 | Hwang et al. |
| 2004/0086263 | A1 | 5/2004 | Arora |
| 2004/0216164 | A1 | 10/2004 | Hayhurst |
| 2005/0138660 | A1 | 6/2005 | Boyer et al. |
| 2005/0149964 | A1 | 7/2005 | Thomas et al. |
| 2005/0198063 | A1 | 9/2005 | Thomas et al. |
| 2005/0251750 | A1 | 11/2005 | Vallone et al. |
| 2005/0273819 | A1 | 12/2005 | Knudson et al. |
| 2007/0079353 | A1 | 4/2007 | Boortz |
| 2008/0189745 | A1 | 8/2008 | Hassell et al. |
| 2010/0146551 | A1 | 6/2010 | Barton et al. |
| 2012/0185901 | A1 | 7/2012 | Macrae et al. |
| 2012/0272270 | A1 | 10/2012 | Boyer et al. |
| 2013/0084058 | A1 | 4/2013 | Westbrook et al. |
| 2013/0125169 | A1 | 5/2013 | Barton |
| 2014/0337894 | A1 | 11/2014 | Knudson et al. |
| 2015/0319504 | A1 | 11/2015 | Westbrook et al. |

FOREIGN PATENT DOCUMENTS

| | | |
|---|---|---|
| EP | 0 691 651 B1 | 2/1999 |
| EP | 0 898 279 A2 | 2/1999 |
| EP | 0 889 649 A3 | 8/1999 |
| EP | 1 158 795 A2 | 11/2001 |
| EP | 1 170 949 A1 | 1/2002 |
| EP | 0 764 951 B1 | 9/2002 |
| GB | 2 340 633 A | 2/2000 |
| GB | 2 343 076 A | 4/2000 |
| JP | 2002-232813 | 8/2002 |
| JP | 2002-345491 | 12/2002 |
| JP | 2002-366570 | 12/2002 |
| JP | 2002-369094 | 12/2002 |
| WO | WO 93/08664 A1 | 4/1993 |
| WO | WO 94/14282 A1 | 6/1994 |
| WO | WO 96/38008 A1 | 11/1996 |
| WO | WO 98/12872 A1 | 3/1998 |
| WO | WO 98/28906 | 7/1998 |
| WO | WO 98/56188 A2 | 12/1998 |
| WO | WO 00/01149 | 1/2000 |
| WO | WO 00/76130 A1 | 12/2000 |
| WO | WO 02/01440 A2 | 2/2002 |
| WO | WO 2004/063891 | 7/2004 |

OTHER PUBLICATIONS

U.S. Appl. No. 10/339,699, Final Office Action dated Nov. 27, 2012.
U.S. Appl. No. 10/339,700, Final Office Action dated Oct. 20, 2006.
U.S. Appl. No. 10/339,700, Final Office Action dated Feb. 7, 2007.
U.S. Appl. No. 11/285,411, Final Office Action mailed Jan. 22, 2013.
U.S. Appl. No. 12/257,352, Non-Final Office Action mailed Feb. 14, 2013.
U.S. Appl. No. 10/189,989, Final Office Action mailed Jun. 24, 2013.
U.S. Appl. No. 11/285,411, Non-Final Office Action mailed Aug. 2, 2013.
U.S. Appl. No. 10/923,445, Non-Final Office Action mailed Nov. 18, 2013.
U.S. Appl. No. 12/257,352, Final Office Action mailed Dec. 2, 2013.
U.S. Appl. No. 13/732,411, Final Office Action mailed Dec. 4, 2013.
U.S. Appl. No. 10/189,989, Non-Final Office Action mailed Jan. 22, 2014.
U.S. Appl. No. 11/285,411, Final Office Action mailed Jan. 30, 2014.
U.S. Appl. No. 12/257,352, Advisory Action mailed Mar. 26, 2014.
U.S. Appl. No. 13/732,411, Advisory Action mailed Mar. 26, 2014.
U.S. Appl. No. 10/923,445, Non-Final Office Action dated Jul. 16, 2014.
U.S. Appl. No. 10/189,989, Notice of Allowance dated Aug. 12, 2014.
U.S. Appl. No. 13/686,806, Final Office Action mailed Aug. 13, 2014.
U.S. Appl. No. 13/867,913, Non-Final Office Action dated Oct. 8, 2014.
U.S. Appl. No. 13/732,411, Non-Final Office Action dated Oct. 29, 2014.
U.S. Appl. No. 13/686,806, Notice of Allowance dated Nov. 26, 2014.
U.S. Appl. No. 10/923,445, Final Office Action dated Jan. 21, 2015.
U.S. Appl. No. 13/686,806, Notice of Allowance dated Mar. 11, 2015.
U.S. Appl. No. 13/867,913, Final Office Action dated Mar. 23, 2015.
U.S. Appl. No. 13/732,411, Final Office Action dated Apr. 8, 2015.
U.S. Appl. No. 11/285,411, Notice of Allowance mailed Jun. 5, 2015.
U.S. Appl. No. 13/867,913, Advisory Action dated Jun. 24, 2015.
Australian Patent Office, Application No. SG 200504349-2, Claims, mailed Jan. 13, 2009, 7 pages.
Australian Patent Office, Application No. SG 200504349-2, Written Opinion, mailed Jan. 13, 2009, 6 pages.
Chinese Patent Office, Application No. 200410039972.8, Claims dated Nov. 2005, 9 pages.
Chinese Patent Office, Application No. 200410039972.8, Office Action dated Nov. 4, 2005, 8 pages.
Chinese Patent Office, Application No. 200480004239.0, Claims dated Jan. 23, 2009, 6 pages.
Chinese Patent Office, Application No. 200480004239.0, Office Action dated Jan. 23, 2009, 5 pages.
Chinese Patent Office, Application No. 200480004283.1, "Notification of the Second Office Action", dated Nov. 11, 2010.
Chinese Patent Office, Application No. 200480004283.1, Claims dated Mar. 6, 2009, 7 pages.
Chinese Patent Office, Application No. 200480004283.1, Claims dated Nov. 11, 2010, 5 pages.
Chinese Patent Office, Application No. 200480004283.1, filed Jan. 8, 2004, First Office Action.
Chinese Patent Office, Application No. 200480004283.1, First Office Action, dated Mar. 6, 2009, 12 pages.
Chinese Patent Office, Application No. 20048004283.1, Notification of Decision of Rejection dated May 25, 2011.
Chinese Patent Office, Application No. 20111016199.0, "Notification of First Office Action", dated Feb. 29, 2012, 9 pages.
Claims of Application No. Application No. PCT/US2004/00564, 3 pages.
European Patent Office, Application No. 04700912.1, Claims dated Mar. 28, 2012, 10 pages.
European Patent Office, Application No. 04700912.1, Office Action dated Mar. 28, 2012, 5 pages.
European Patent Office, Application No. 04700913.9, Claims dated Jun. 2011, 5 pages.
European Patent Office, Application No. 04700913.9, Office Action dated Feb. 22, 2011, 8 pages.
European Patent Office, Application No. 04700913.9, Supplementary Search Report dated Oct. 23, 2009, 6 pages.
European Patent Office, Application No. 05 851 948.9-1905, Current Claims dated Feb. 2013, 4 pages.
European Patent Office, Application No. 05 851 948.9-1905, Office Action dated Feb. 21, 2013, 8 pages.
European Patent Office, Application No. App No. 04700912.1, "Supplementary European Search Report", dated Jan. 1, 2006, 5 pages.
Japanese Patent Office, Application No. 2006-500884, Claims dated Jun. 16, 2009, 6 pages.
Japanese Patent Office, Application No. 2006-500884, Preliminary Rejection dated Jun. 16, 2009, 5 pages.
Japanese Patent Office, Application No. 2006-500885, Office Action dated Feb. 18, 2010, 3 pages.
Japanese Patent Office, Application No. 2006-500885, Office Action dated Feb. 2010, 9 pages.
Japanese Patent Office, Application No. 2006-500885, Office Action dated Jul. 16, 2009, 4 pages.

(56) References Cited

OTHER PUBLICATIONS

McFedries, P., "The Complete Idiot's Guide to Windows 95," dated 1997, Que Corporation, 2nd Edition, pp. 36-39.
Microsoft Press Computer Dictionary, Microsoft Press, Third Edition, 1997, p. 355.
Singapore Patent Office, Application No. 200504613-1, Examination Report dated Jun. 25, 2007, 5 pages.
World Intellectual Property Organization, Application No. PCT/US2004/00561, International Search Report and Written Opinion dated Dec. 8, 2004, 11 pages.
World Intellectual Property Organization, Application No. PCT/US2004/00564, Preliminary Search Report, dated Jul. 21, 2005, 8 pages.
European Patent Office, Application No. 04700913.9, Pending Claims as of Aug. 12, 2015.
European Patent Office, Application No. 04700913.9, Summons to Oral Proceedings dated Aug. 12, 2015.
United States Patent and Trademark Office, U.S. Appl. No. 14/799,520, Non-Final Office Action dated Apr. 14, 2016, Mailed Apr. 14, 2016.

* cited by examiner

Structure of a Viewing Object

Structure of a Object Schema

Traversing a Directory Graph

FIG. 5  Processing Preference Information

FIG. 6 Scheduling Recordings

FIG. 7 Scheduling a Recording

SYSTEM FOR REMOTELY CONTROLLING CLIENT RECORDING AND STORAGE BEHAVIOR

CROSS REFERENCE TO RELATED APPLICATIONS

This application is a continuation of U.S. patent application Ser. No. 13/686,806, filed Nov. 27, 2012, which is a continuation of U.S. patent application Ser. No. 12/806,661, filed Aug. 16, 2010, which is a continuation of U.S. patent application Ser. No. 12/360,102, filed Jan. 26, 2009, now U.S. Pat. No. 7,779,446, which is a continuation of U.S. patent application Ser. No. 10/339,700, filed Jan. 8, 2003, now U.S. Pat. No. 7,543,325, which claims benefit of U.S. Provisional Patent Application Ser. No. 60/347,181, filed on Jan. 8, 2002 and is a continuation-in-part of U.S. patent application Ser. No. 09/422,121, filed on Oct. 20, 1999, now U.S. Pat. No. 7,665,111, which claims benefit of U.S. Provisional Patent Application Ser. No. 60/127,178, filed on Mar. 30, 1999, the entire contents of which are incorporated herein by reference. The applicant(s) hereby rescind any disclaimer of claim scope in the parent application(s) or the prosecution history thereof and advise the USPTO that the claims in this application may be broader than any claim in the parent application(s).

BACKGROUND OF THE INVENTION

1. Technical Field

The invention relates to controlling the storage and recording behaviors of a client system. More particularly, the invention relates to remotely controlling the storage and recording behaviors of a client system from a server.

2. Description of the Prior Art

A classic tension exists in the design of automated data processing systems between pure client-server based systems, such as computer mainframe systems or the World Wide Web, and pure distributed systems, such as Networks of Workstations (NOWS) that are used to solve complex computer problems, such as modeling atomic blasts or breaking cryptographic keys.

Client-server systems are popular because they rely on a clean division of responsibility between the server and the client. The server is often costly and specially managed, since it performs computations or stores data for a large number of clients. Each client is inexpensive, having only the local resources needed to interact with the user of the system. A network of reasonable performance is assumed to connect the server and the client. The economic model of these systems is that of centralized management and control driving down the incremental cost of deploying client systems.

However, this model has significant costs that must be considered. For instance, the incremental cost of adding a new client system may be quite high. Additional network capacity must be available, sufficient computing resources must be available to support that client, including storage, memory and computing cycles, and additional operational overhead is needed for each client because of these additional resources. As the central servers become larger and more complex they become much less reliable. Finally, a system failure of the server results in all clients losing service.

Distributed systems are popular because the resources of the system are distributed to each client, which enables more complex functionality within the client. Access to programs or data is faster since they are located with the client, reducing load on the network itself. The system is more reliable, since the failure of a node affects only it. Many computing tasks are easily broken down into portions that can be independently calculated, and these portions are cheaply distributed among the systems involved. This also reduces network bandwidth requirements and limits the impact of a failed node.

On the other hand, a distributed system is more complex to administer, and it may be more difficult to diagnose and solve hardware or software failures.

Television viewing may be modeled as a client-server system, but one where the server-to-client network path is for all intents and purposes of infinite speed, and where the client-to-server path is incoherent and unmanaged. This is a natural artifact of the broadcast nature of television. The cost of adding another viewer is zero, and the service delivered is the same as that delivered to all other viewers.

There have been, and continue to be, many efforts to deliver television programming over computer networks, such as the Internet, or even over a local cable television plant operating as a network. The point-to-point nature of computer networks makes these efforts unwieldy and expensive, since additional resources are required for each additional viewer. Fully interactive television systems, where the viewer totally controls video streaming bandwidth through a client settop device, have proven even more uneconomical because dedication of server resources to each client quickly limits the size of the system that can be profitably built and managed.

However, television viewers show a high degree of interest in choice and control over television viewing. This interest results in the need for the client system to effectively manage the memory demands of program material that a viewer wants to record. Additionally, the management of recording desired program material is of equal importance to the memory management task.

Many in-home consumer electronics devices already contain mass storage, with many more to come. The amount of storage available in these devices is already staggering, and there is no end in sight to the "double each year" rule-of-thumb for disk drives. Other types of storage media are also getting larger in storage capacity every year, including: CompactFlash, SmartMedia, Zip, Flash Memory Sticks, MicroDrive, PocketDrive, and SuperDisk.

The obvious control of this storage is by the viewer, storing his own TV shows, music, pictures, etc. on his client system. A less obvious use, but one that will continue to grow in application and importance, is a service-provider's control of this storage. There will be a continually growing desire for a service provider to have control over storage that is physically possessed by the viewer.

It would be advantageous to provide a system for remotely controlling client recording and storage behavior that allows a service provider to remotely control the storage behavior of a client system. It would further be advantageous to provide a system for remotely controlling client recording and storage behavior that allows a service provider to remotely control the recording behavior of a client system.

SUMMARY OF THE INVENTION

The invention provides a system for remotely controlling client recording and storage behavior. The system allows a service provider to remotely control the storage behavior of a client system. In addition, the invention provides a system that allows a service provider to remotely control the recording behavior of a client system.

A client device, typified in U.S. Pat. No. 6,233,389, owned by the Applicant, provides functionality typically associated with central video servers, such as storage of a large amount of video content, ability to choose and play this content on demand, and full "VCR-like" control of the delivery of the content, as typified in U.S. Pat. No. 6,327,418, owned by the applicant.

A preferred embodiment of the invention schedules the recording, storing, and deleting of multimedia content on a client system storage device. The invention accepts as input a prioritized list of program viewing preferences which is compared with a database of program guide objects. The program guide objects indicate when content of interest are actually broadcast.

A schedule of time versus available storage space is generated that is optimal for the viewer's explicit or derived preferred content. The viewer may request that certain content be captured, which results in the highest possible priority for those content.

The viewer may also explicitly express preferences using appurtenances provided through the viewer interface. Preferences may additionally be inferred from viewing patterns. These preferences correspond to objects stored in a replicated database.

The invention provides objects called a capture requests that are sent by the service to client systems. Capture requests reflect local storage management decisions about how the client system storage is allocated (partitioned). The capture requests may be authored and changed over time. Capture requests also allow the service to determine content to be recorded by the client system in the same manner that a viewer requests that certain content are recorded.

Capture requests are more powerful than what a viewer can request. Recording requests for a capture request can preempt viewer requests or be entered at the same or lower priority as a viewer request. Capture requests can adjust all aspects of a recording request and affect the capture request itself. Client system operational functionality are also manipulated by the service using capture requests.

The invention correlates an input schedule that tracks the free and occupied time slots for each input source with a space schedule that tracks all currently recorded content and the content that have been scheduled to be recorded in the future, to schedule new content to record and resolve recording conflicts. Content is recorded if at all times between when the recording would be initiated and when it expires, sufficient space is available to hold it. Content scheduled for recording based on inferred preferences automatically lose all conflict decisions. All scheduling conflicts are resolved as early as possible. Schedule conflicts resulting from the recording of aggregate objects are resolved using the preference weighting of the content involved.

A background scheduler attempts to schedule each preferred content in turn until the list of preferred content is exhausted or no further opportunity to record is available. A preferred content is scheduled if and only if there are no conflicts with other scheduled content.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a system for remotely controlling client recording and storage behavior. A system according to the invention allows a service provider to remotely control the storage behavior of a client system. In addition, the invention allows a service provider to remotely control the recording behavior of a client system.

The invention is embodied in a television viewing information transmission and collection system that improves the ability of the individual viewer to select and automatically timeshift television programs while providing opportunities for a service provider to enhance and direct the viewing experience. The invention describes a system which is fully distributed, in that calculations pertaining to an individual viewer are performed personally for that viewer within a local client device, while providing for the reliable aggregation and dissemination of information concerning viewing habits, preferences or purchases.

The Database of Television Viewing Information

Figure 1:
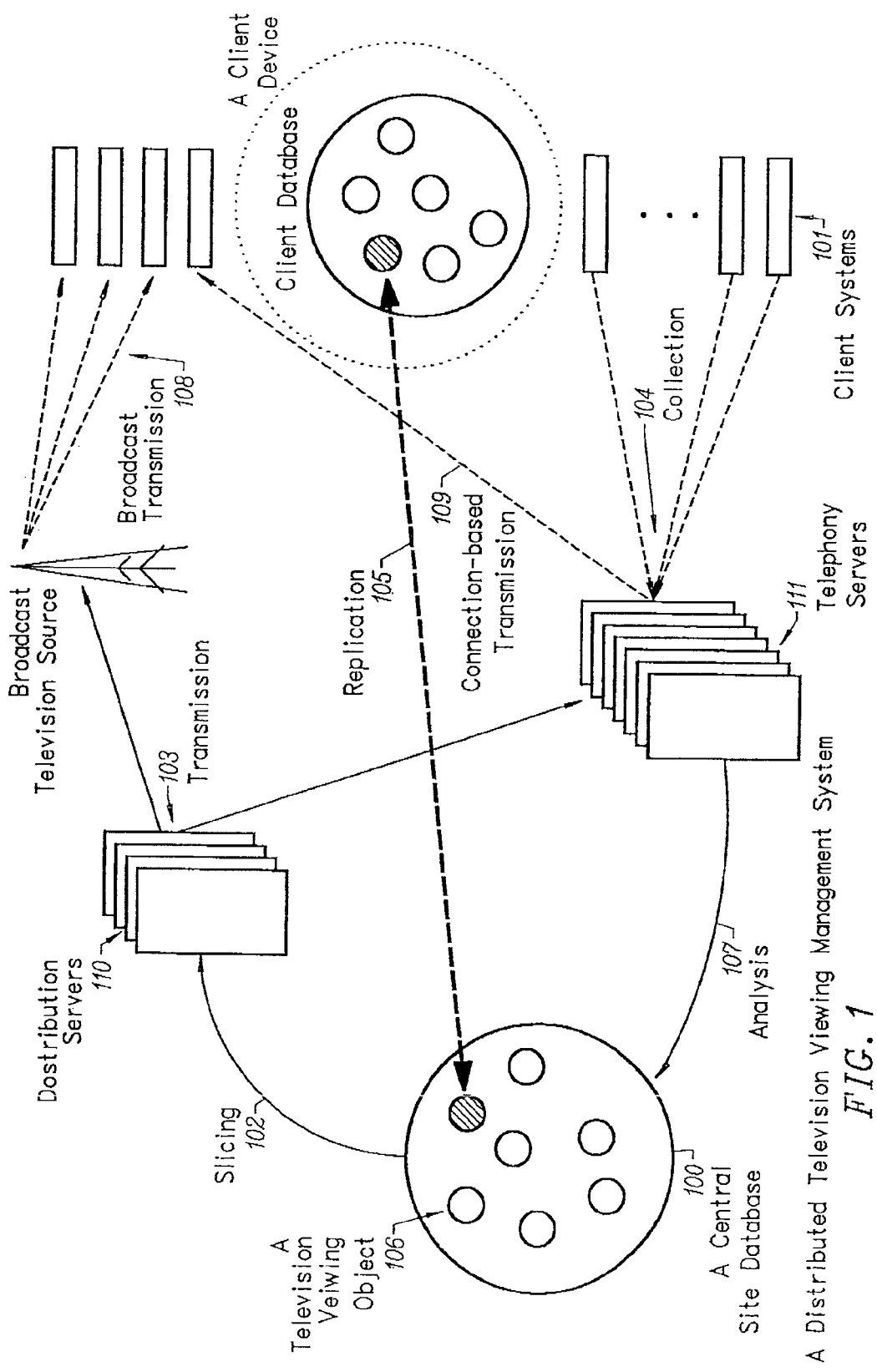
FIG. 1 is a block schematic diagram of a preferred embodiment of a distributed television viewing management system according to the invention.

FIG. 1 gives a schematic overview of the invention. Central to the invention is a method and apparatus for maintaining a distributed database of television viewing information among computer systems at a central site 100 and an extremely large number of client computing systems 101. The process of extracting suitable subsets of the central copy of the database is called "slicing" 102, delivering the resulting "slices" to clients is called "transmission" 103, delivering information collected about or on behalf of the viewer to the central site is called "collection" 104, and processing the collected information to generate new television viewing objects or reports is called "analysis" 107; in all cases, the act of recreating an object from one database within another is called "replication" 105. Data items to be transmitted or collected are termed "objects" 106, and the central database and each replicated subset of the central database contained within a client device is an "object-based" database. The objects within this database are often termed "television viewing objects", "viewing objects", or simply "objects", emphasizing their intended use. However, one skilled in the art will readily appreciate that objects can be any type of data.

The viewing object database provides a consistent abstract software access model for the objects it contains, independent of and in parallel with the replication activities described herein. By using this interface, applications may create, destroy, read, write and otherwise manipulate objects in the database without concern for underlying activities and with assurance that a consistent and reliable view of the objects in the database and the relationships between them is always maintained.

Basic Television Viewing Object Principles

Figure 2:
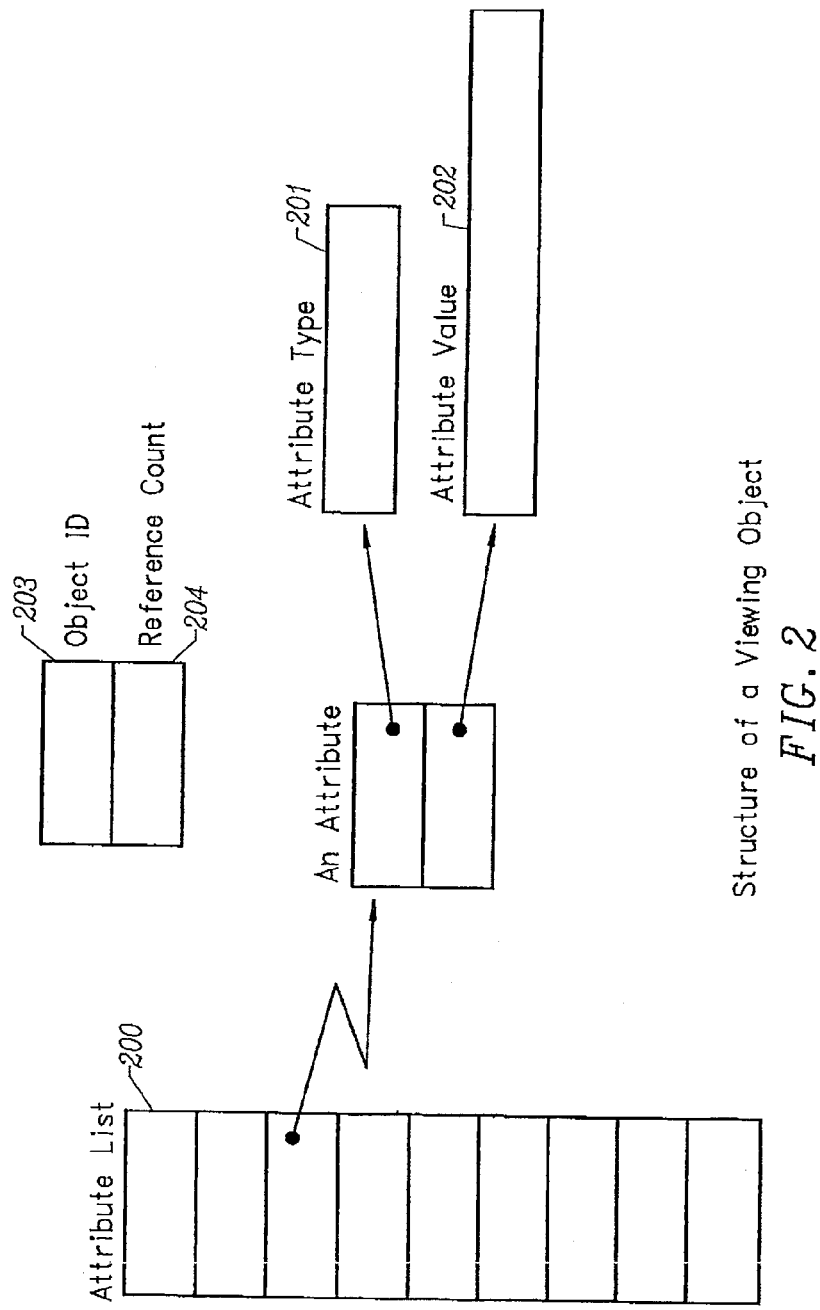
FIG. 2 is a block schematic diagram of the structure of a viewing object in computer storage for programmatic access according to the invention.

Referring to FIG. 2, television viewing objects are structured as a collection of "attributes" 200. Each attribute has a type 201, e.g., integer, string or boolean, and a value 202. All attribute types are drawn from a fixed pool of basic types supported by the database.

The attributes of an object fall into two groups: "basic" attributes, which are supplied by the creator or maintainer of the viewing object; and "derived" attributes, which are automatically created and maintained by mechanisms within the database. Basic attributes describe properties of the object itself; derived attributes describe the relationships between objects. Basic attributes are replicated between databases, whereas derived attributes are not.

Figure 3:
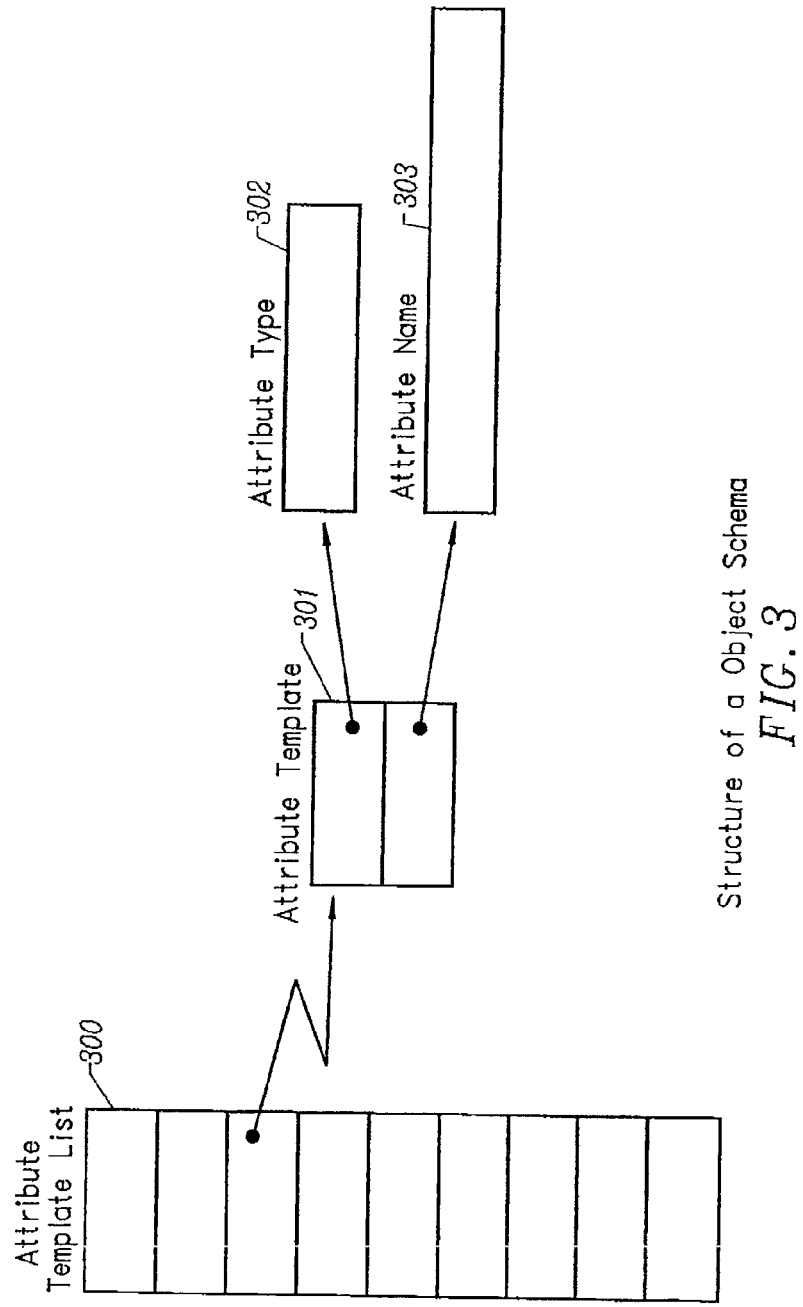
FIG. 3 is a block schematic diagram showing how the schema for a viewing object is structured in computer storage for programmatic access according to the invention.

With respect to FIG. 3, there is a small set of fundamental object types defined by the invention; each object type is represented as a specific set of related attributes 300, herein called a "schema". The schema defines a template for each attribute type 301, which includes the type 302 and name of the attribute 303. Actual television viewing objects are created by allocating resources for the object and assigning values to the attributes defined by the schema. For example, a "program" schema might include attributes such as the producer, director or actors in the program, an on-screen icon, a multi-line description of the program contents, an editorial rating of the program, etc. A physical program object is created by allocating storage for it, and filling in the attributes with relevant data.

There is one special object type predefined for all databases called the schema type. Each schema supported by the database is represented by a schema object. This allows an application to perform "introspection" on the database, i.e., to dynamically discover what object types are supported and their schema. This greatly simplifies application software and avoids the need to change application software when schemas are changed, added or deleted. Schema objects are handled the same as all other viewing objects under the methods of this invention.

Referring again to FIG. 2, each object in a database is assigned an "object ID" 203 which must be unique within the database. This object ID may take many forms, as long as each object ID is unique. The preferred embodiment uses a 32-bit integer for the object ID, as it provides a useful tradeoff between processing speed and number of unique objects allowed. Each object also includes a "reference count" 204, which is an integer giving the number of other objects in the database which refer to the current object. An object with a reference count of zero will not persist in the database (see below).

One specific type of viewing object is the "directory" object. A directory object maintains a list of object IDs and an associated simple name for the object. Directory objects may include other directory objects as part of the list, and there is a single distinguished object called the "root" directory. The sequence of directory objects traversed starting at the root directory and continuing until the object of interest is found is called a "path" to the object; the path thus indicates a particular location within the hierarchical namespace created among all directory objects present in the database. An object may be referred to by multiple paths, meaning that one object may have many names. The reference count on a viewing object is incremented by one for each directory which refers to it.

Methods for the Maintenance of Database Consistency and Accuracy

One of the features of a preferred embodiment of the invention is to insure that each database replica remains internally consistent at all times, and that this consistency is automatically maintained without reference to other databases or the need for connection to the central site. There is no assurance that transmission or collection operations happen in a timely manner or with any assured periodicity. For instance, a client system may be shut off for many months; when a transmission to the system is finally possible, the replication of objects must always result in a consistent subset of the server database, even if it is not possible to transmit all objects needed to bring the central and client databases into complete synchronization.

Even more serious, there can be no guarantee of a stable operational environment while the database is in use or being updated. For example, electrical power to the device may cease. This invention treats all database updates as "transactions", meaning that the entire transaction will be completed, or none of it will be completed. The specific technique chosen is called "two-phase commit", wherein all elements of the transaction are examined and logged, followed by performing the actual update. One familiar in the art will appreciate that a standard journaling technique, where the transaction is staged to a separate log, combined with a roll-forward technique which uses the log to repeat partial updates that were in progress when the failure occurred, is sufficient for this purpose.

One required derived attribute of every object is the "version", which changes with each change to the object; the version attribute may be represented as a monotonically increasing integer or other representation that creates a monotonic ordering of versions. The schema for each object that may be replicated includes an attribute called "source version" which indicates the version of the object from which this one was replicated.

Transmission of a viewing object does not guarantee that every client receives that object. For instance, while the object is being broadcast, external factors such as sunspots, may destroy portions of the transmission sequence. Viewing objects may be continually retransmitted to overcome these problems, meaning that the same object may be presented for replication multiple times. It is inappropriate to simply update the database object each time an object to be replicated is received, as the version number will be incremented although no change has actually occurred. Additionally, it is desirable to avoid initiating a transaction to update an object if it is unnecessary; considerable system resources are consumed during a transaction.

Two approaches are combined to resolve this problem. First, most objects will have a basic attribute called "expiration". This is a date and time past which the object is no longer valid, and should be discarded. When a new object is received, the expiration time is checked, and the object discarded if it has expired. Expiration handles objects whose transmission is delayed in some fashion, but it does not handle multiple receptions of the same unexpired object.

The source version attribute handles this problem. When a viewing object is transmitted, this attribute is copied from the current version attribute of the source object. When the viewing object is received, the source version of the received object is compared with the source version of the current object. If the new object has a higher source version attribute, it is copied over the existing object, otherwise it is discarded.

It is assumed that a much greater number of viewing objects are transmitted than are of interest to any particular client system. For example, a "channel" viewing object which describes the channels on a particular cable system is of no interest to clients attached to other cable systems. Because of the overhead of capturing and adding new objects to the database, it would be advantageous for received objects to be filtered on other attributes in addition to those described above. The invention accomplishes this by using a filtering process based on object type and attribute values. In one implementation, this filtering process is based on running executable code of some kind, perhaps as a sequence of commands, which has been written with specific knowledge of various object types and how they should be filtered.

In a preferred embodiment of the invention, a "filter" object is defined for each object type which indicates what attributes are required, should not be present, or ranges of values for attributes that make it acceptable for addition to the database. One skilled in the art will readily appreciate that this filter object may contain executable code in some form, perhaps as a sequence of executable commands. These commands would examine and compare attributes and attribute values of object being filtered, resulting in an indication of whether the object should be the subject of further processing.

Viewing objects are rarely independent of other objects. For example, a "showing" object (describing a specific time on a specific channel) is dependent on a "program" object (describing a specific TV program). One important aspect of maintaining consistency is to insure that all dependent objects either already exist in the database or are to be added as part of a single transaction before attempting to add a new viewing object. This is accomplished using a basic attribute of the new viewing object called the "dependency" attribute, which simply lists the object IDs and source versions of objects that the new object is dependent on. Clearly, new versions of an object must be compatible, in the sense that the schema defining new versions be the same or have a strict superset of the attributes of the original schema.

When a new viewing object is received, the database is first checked to see if all dependencies of that object are present; if so, the object is added to the database. Otherwise, the new object is "staged", saving it in a holding area until all dependent objects are also staged. Clearly, in order for a new set of viewing objects to be added to the database, the dependency graph must be closed between objects in the staging area and objects already existing in the database, based on both object ID and source version. Once closure is achieved, meaning all dependent objects are present, the new object(s) are added to the database in a single atomic transaction.

Naming and Finding Television Viewing Objects

Figure 4:
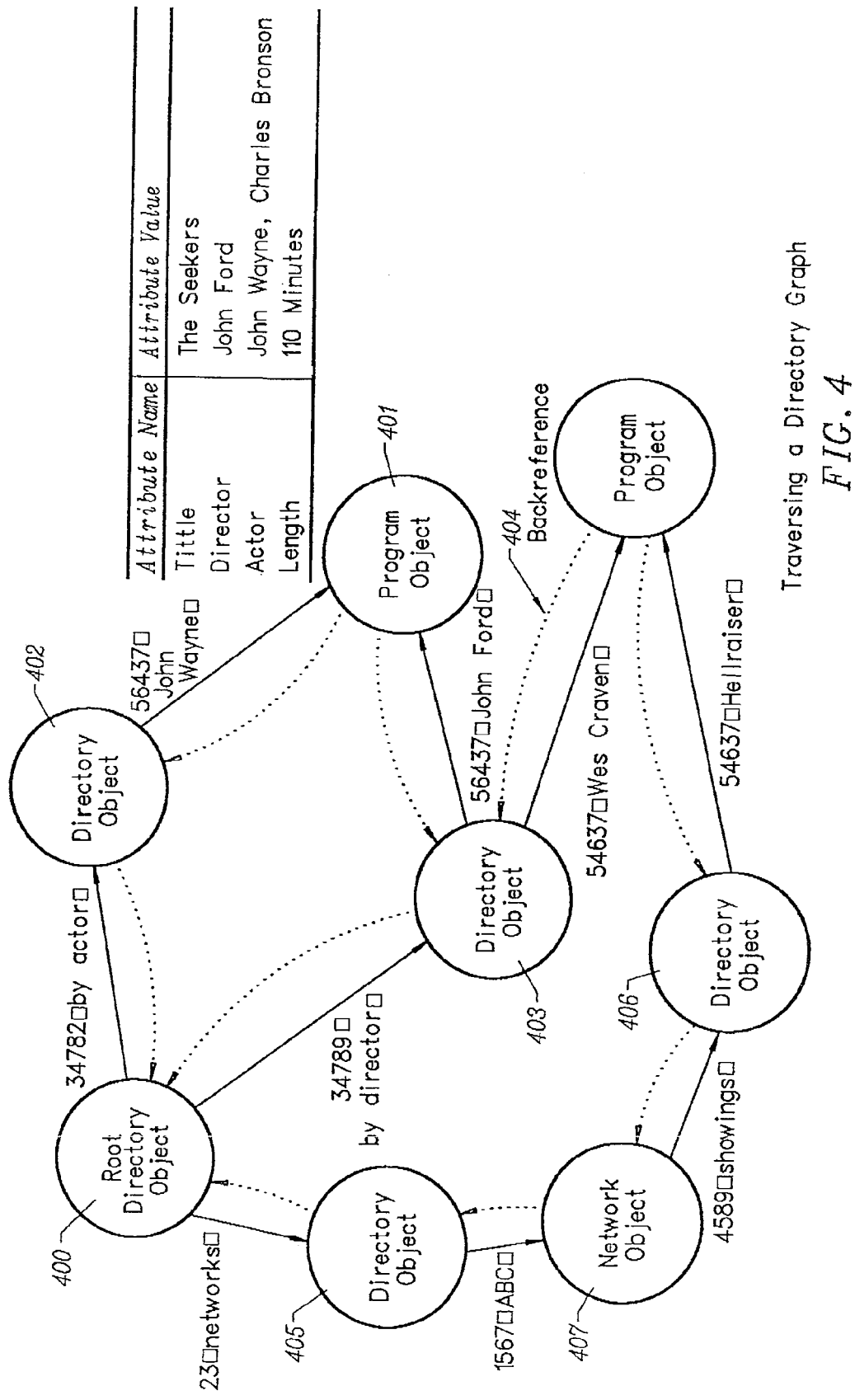
FIG. 4 is a block schematic diagram showing an example graph of relationships between viewing objects which describe information about programs according to the invention.

Directory objects have been described previously. Referring to FIG. 4, the collection of directory objects, and the directed graph formed by starting at the root path 400 and enumerating all possible paths to viewing objects is called a "namespace". In order for an object to be found without knowing a specific object ID, one or more paths within this namespace must refer to it. For instance, application software has little interest in object IDs, instead the software would like to refer to objects by paths, for instance "/tvschedule/today". In this example, the actual object referred to may change every day, without requiring changes in any other part of the system.

One way in which a path to an object may be established is by specifying a "pathname" basic attribute on the object. The object is added to the database, and directory objects describing the components of the path are created or updated to add the object. Such naming is typically used only for debugging the replication mechanisms. Setting explicit paths is discouraged, since the portions of the central database replicated on each client system will be different, leading to great difficulty in managing pathnames among all replicas of the database.

A preferred method for adding an object to the database namespace is called "indexing". In a preferred embodiment of the invention, an "indexer" object is defined for each object type which indicates what attributes are to be used when indexing it into the database namespace. One skilled in the art will readily appreciate that this indexer object may contain executable code in some form, perhaps as a sequence of executable commands. These commands would examine and compare attributes and attribute values of object being indexed, resulting in an indication of where the object should be located in the namespace.

Based on the object type, the indexer examines a specific set of attributes attached to the object. When such attributes are discovered the indexer automatically adds a name for the object, based on the value of the attribute, within the hierarchical namespace represented by the graph of directories in the database. Referring again to FIG. 4, a program object may have both an "actor" attribute with value "John Wayne" and a "director" attribute with value "John Ford" 401. The root directory might indicate two sub-directories, "byactor" 402 and "bydirector" 403. The indexer would then add the paths "/byactor/John Wayne" and "/bydirector/John Ford" to the database, both of which refer to the same object 401.

A derived attribute is maintained for each object listing the directory objects which refer to this object 404. As the indexer adds paths to the namespace for this object, it adds the final directory ID in the path to this list. This insures closure of the object graph—once the object has been found, all references to that object within the database are also found, whether they are paths or dependencies.

This unique and novel method of adding objects to the database has significant advantages over standard approaches. The indexer sorts the object into the database when it is added. Thus, the search for the object associated with a particular path is a sequence of selections from ordered lists, which can be efficiently implemented by one familiar with the art.

Deleting Objects from the Database

While the rules for adding objects to the database are important, the rules for removing objects from the database are also important in maintaining consistency and accuracy. For example, if there were no robust rules for removing objects, the database might grow unboundedly over time as obsolete objects accumulate.

The cardinal rule for deleting objects from the database is based on reference counting; an object whose reference count drops to zero is summarily deleted. For instance, this means that an object must either be referred to by a directory or some other object to persist in the database. This rule is applied to all objects in the closed dependency graph based on the object being deleted. Thus, if an object which refers to other objects (such as a directory) is deleted, then the reference count on all objects referred to is decremented, and those objects similarly deleted on a zero count, and so forth.

There is also an automatic process which deletes objects from the database called the "reaper". Periodically, the reaper examines all objects in the database, and depending on the object type, further examines various attributes and attribute values to decide if the object should be retained in the database. For example, the expiration attribute may indicate that the object is no longer valid, and the reaper will delete the object.

In the preferred embodiment, using a method similar to (or perhaps identical to) the filtering and indexing methods described above, the reaper may instead access a reaper object associated with the object type of the current object, which may contain executable code of various kinds, perhaps a sequence of executable commands. This code examines the attributes and attribute values of the current object, and determines if the object should be deleted.

The overhead of individually deleting every object for which the reference count has been decremented to zero may be quite high, since every such deletion results in a transaction with the database. It would be advantageous to limit the performance impact of reaping objects, such that foreground operations proceed with maximum speed. In a preferred embodiment, this is accomplished using a technique based on common garbage collection methods.

For instance, instead of deleting an object whose reference count has been decremented to zero, the reaper performs no other action. Periodically, a background task called the garbage collector examines each object in the database. If the object has a reference count of zero, it is added to a list of objects to be deleted. In one embodiment, once the garbage collector has examined the entire database, it would delete all such objects in a single transaction. One familiar in the art will appreciate that this method may also result in a significant performance penalty, as other accesses to the database may be delayed while the objects are being deleted. In addition, if all objects are to be properly deleted, changes to the database may have to be delayed while the garbage collector is active, resulting in even worse performance.

In a preferred embodiment, the garbage collector examines the database in a series of passes. Once a specific number of objects has been collected, they are deleted in a single transaction. Said process continues until all objects have been examined. This technique does not guarantee that all garbage objects are collected during the examination process, since parallel activities may release objects previously examined. These objects will be found, however, the next time the garbage collector runs. The number of objects deleted in each pass is adjustable to achieve acceptable performance for other database activities.

Operations on the Distributed Television Viewing Object Database
Considerations in Maintaining the Distributed Viewing Object Database The replication of television viewing objects among the instances of the distributed database necessarily requires the transmission of objects over unreliable and unsecure distribution channels.

For example, if the objects are transmitted over a broadcast mechanism, such as within a radio or television transmission, there can be no assurance that the data is transmitted accurately or completely. Weather, such as rainstorms, may cause dropouts in the transmission. Other sources of interference may be other broadcast signals, heavy equipment, household appliances, etc.

One skilled in the art will readily appreciate that there are standard techniques for managing the transmission of data over unreliable channels, including repeated transmissions, error correcting codes, and others, which may be used for transmission, any or all of which may be used in any particular instance.

For efficiency, objects to be replicated are gathered together into distribution packages, herein called "slices". A slice is a subset of the television viewing object database which is relevant to clients within a specific domain, such as a geographic region, or under the footprint of a satellite transmitter.

Security of these slices is quite important. Slices are used to add objects to the database which are used to provide valuable services to users of the database, as well as to store information that may be considered private or secret. Because of the broadcast-oriented nature of slice transmission, slices may be easily copied by third parties as they are transmitted. A practical solution to these problems is to encrypt the slice during transmission. An ideal reference text on the techniques employed in the invention is "Applied Cryptography: Protocols, Algorithms, and Source Code in C" by Bruce Schneier, John Wiley and Sons, 1995.

In a preferred embodiment of the invention, a secure, encrypted channel is established using techniques similar to those described in U.S. Pat. No. 4,405,829, often described as asymmetric key encryption, or sometimes public/private key pair encryption. A practitioner skilled in the art will recognize that protocols based on asymmetric key encryption serves as a reliable and efficient foundation for authentication of client devices and secure distribution of information. In general, authentication is provided using an exchange of signed messages between the client and central systems. Secure distribution is provided by encrypting all communications using a short-lived symmetric key sent during an authentication phase.

Successful security requires that sender and receiver agree beforehand on the asymmetric key pair to be used for encryption. Such key distribution is the weakest link in any cryptographic system for protecting electronic data. U.S. Pat. No. 6,385,739, entitled "Self-Test Electronic Assembly and Test System," filed Jul. 19, 1999, also owned by the Applicant, describes a mechanism whereby the client device generates the asymmetric key pair automatically as the final step in the manufacturing process. The private key thus generated is stored within a secure microprocessor embedded within the client device, such that the key is never presented to external devices. The public key thus generated is transmitted to a local manufacturing system, which records the key along with the client serial number in a secure database. This database is later securely transmitted to the central distribution system, where it is used to perform secure communications with the client.

This unique and novel application of key generation solves the problem of key distribution, as the private key is never presented to external components in the client, where it might be discerned using special tools, such as a logic analyzer. Instead, it may only be used within the security microprocessor itself to decrypt messages originally encrypted with the public key, the results of which are then provided to external components.

The remainder of this discussion assumes that all communications between client and central systems are authenticated and encrypted as described above.

Transmitting Viewing Objects to the Client Systems

Referring again to FIG. 1, in a preferred embodiment of the invention the following steps constitute "transmission" of television viewing objects from the central database using slices:

1. There may be many mechanisms for transmitting slices to the universe of client viewing devices. For instance, the slices may be directly downloaded over a telephone modem or cable modem 109, they may be modulated into lines of the Vertical Blanking Interval (VBI) of a standard television broadcast 108, or added to a digital television multiplex signal as a private data channel. One skilled in the art will readily appreciate that any mechanism which can transmit digital information may be used to transmit slices of the television viewing object database.

The first step in preparing television viewing objects for transmission is recognizing the transmission mechanism to be used for this particular instance, and creating a slice of a subset of the database that is customized for that mechanism. For example, the database may contain television viewing objects relating to all programs in the country. However, if television viewing objects are to be sent using VBI modulation on a local television signal, only those television viewing objects relating to programs viewable within the footprint of the television broadcast being used to carry them should be contained within the relevant slice. Alternatively, if some of the television viewing objects contain promotional material related to a particular geographic region, those objects should not be transmitted to other geographic regions.

In a preferred embodiment of the invention, the speed and periodicity of traversing the database and generating slices for transmission is adjustable in an arbitrary fashion to allow useful cost/performance tradeoffs to be made. For instance, it may only be necessary to create slices for certain transmission methods every other day, or every hour.

The final step in preparing each slice is to encrypt the slice using a short-lived symmetric key. Only client devices which have been authenticated using secure protocols will have a copy of this symmetric key, making them able to decrypt the slice and access the television viewing objects within it.

2. Once a slice is complete, it is copied to the point at which the transmission mechanism can take and send the data 110. For telephone connections, the slice is placed on a telephony server 111 which provides the data to each client as it calls in. If television broadcast is used, the slice is copied onto equipment co-resident with the station television transmitter, from whence it is modulated onto the signal. In these and similar broadcast-oriented cases, the slice is "carouseled", i.e., the data describing the slice is repeated continually until a new slice is provided for transmission.

This repetitive broadcast of slices is required because there can be no assurance that the signal carrying the data arrives reliably at each client. The client device may be powered off, or there may be interference with reception of the signal. In order to achieve a high degree of probability that the transmitted slices are properly received at all client devices, they are continually re-broadcast until updated slices are available for transmission.

A preferred embodiment of the invention uses broadcast mechanisms such as a television signal to transmit the slice. However, it is desirable to provide for download over a connection-based mechanism, such as a modem or Internet connection. Using a connection-based mechanism usually results in time-based usage fees, making it desirable to minimize the time spent transmitting the slice.

This is accomplished using a two-step process. When the connection is established, the client system sends an inventory of previously received slices to telephony servers 111. The server compares this inventory with the list of slices that should have been processed by that client. Slices which were not processed are transmitted to the client system.

3. The slice is transmitted by breaking the encrypted slice into a succession of short numbered data packets. These packets are captured by client systems and held in a staging area until all packets in the sequence are present. The packets are reassembled into the slice, which is then decrypted. The television viewing objects within the slice are then filtered for applicability, possibly being added to the local television viewing object database. This process replicates a portion of the central database of television viewing objects reliably into the client.

The invention keeps track of the time at which data packets are received. Data packets which are older than a selected time period are purged from the staging area on a periodic basis; this avoids consuming space for an indefinite period while waiting for all parts of a slice to be transmitted.

Especially when transmitting the objects over a broadcast medium, errors of various kinds may occur in the transmitted data. Each data packet is stamped with an error detecting code (a parity field or CRC code, for example). When an error is detected the data packet is simply discarded. The broadcast carousel will eventually retransmit the data packet, which is likely to be received properly. Slices of any size may thus be sent reliably; this is achieved at the cost of staging received portions of the object on the client until all portions are properly received.

4. There may be one or more "special" slices transmitted which communicate service related data to the client system, particularly service authorization information. It is important that the service provider be able to control the client system's access to premium services if the viewer has failed to pay his bill or for other operational reasons.

One particular type of special slice contains an "authorization" object. Authorization objects are generally encrypted using asymmetric key encryption based on the public/private key pair associated with a specific client. If the slice can be successfully decrypted by the security microprocessor using the embedded private key, the slice will contain an object indicating the allowable time delay before another authorization object is received, as well as one or more symmetric keys valid for a short time period. The delay value is used to reset a timestamp in the database indicating when the client system will stop providing services. The symmetric keys are stored in the local television viewing object database, to be used in decrypting new slices which may be received.

If the client has not received a proper authentication object by the time set in the database, it will commence denial of most services to the viewer (as specified by the service provider). Also contained within an authentication object are one or more limited-lifetime download keys which are needed to decrypt the slices that are transmitted. Clearly, if a client system is unable to authenticate itself, it will not be able to decrypt any objects.

Each authorization slice is individually generated and transmitted. If broadcast transmission is used for the slices, all relevant authorizations are treated identically to all other slices and carouseled along with all other data. If direct transmission is used, such as via a phone connection, only the authentication slice for that client is transmitted.

5. Once the client device has received a complete database slice, it uses the methods described earlier to add the new object contained within it to the database.

Collecting Information from the Client Systems

Referring again to FIG. 1, in a preferred embodiment of the invention the following steps constitute "collection" of television viewing objects from each client database:

1. As the viewer navigates the television channels available to him, the client system records interesting information, such as channel tuned to, time of tuning, duration of stay, VCR-like actions (e.g., pause, rewind), and other interesting information. This data is stored in a local television viewing object.

Additionally, the viewer may indicate interest in offers or promotions that are made available, or he may indicate a desire to purchase an item. This information is also recorded into a local television viewing object.

Additionally, operation of the client device may result in important data that should be recorded into a television viewing object. For example, errors may occur when reading from the hard disk drive in the client, or the internal temperature of the device may exceed operational parameters. Other similar types of information might be failure to properly download an object, running out of space for various disk-based operations, or rapid power cycling.

2. At a certain time, which may be immediate or on a periodic basis, the client system contacts the central site via a direct connection 104 (normally via phone and/or an Internet connection). The client device sends a byte sequence identifying itself which is encrypted with its secret key. The server fetches the matching television viewing object for the client device from the database, and uses the key stored there to decrypt the byte sequence. At the same time, the server sends a byte sequence to the client, encrypted in its secret key, giving the client a new one-time encryption key for the session.

Both sides must successfully decrypt their authentication message in order to communicate. This two-way handshake is important, since it assures both client and server that the other is valid. Such authentication is necessary to avoid various attacks that may occur on the client system. For example, if communications were not authenticated in such a fashion, a malicious party might create an "alias" central site with a corrupt television viewing object database and provide bad information to a client system, causing improper operation. All further communication is encrypted using the one-time session key. Encrypted communication is necessary because the information may pass across a network, such as the Internet, where data traffic is open to inspection by all equipment it passes through. Viewing objects being collected may contain information that is considered private, so this information must be fully protected at all times.

Assuming that the authentication phase is successful, the two parties treat the full-duplex phone line as two one-way broadcast channels. New slices are delivered to the client, and viewing data to be collected is sent back. The connection is ended when all data is delivered.

One skilled in the art will readily appreciate that this connection may take place over a network, such as the Internet running standard TCP/IP protocols, transparently to all other software in the system.

3. Uploaded information is handled similarly by the server; it is assumed to represent television viewing objects to be replicated into the central database. However, there may be many uploaded viewing objects, as there may be many clients of the service. Uploaded objects are therefore assigned a navigable attribute containing information about their source; the object is then indexed uniquely into the database namespace when it is added.

Uploaded viewing objects are not immediately added to the central database; instead they are queued for later insertion into the database. This step allows the processing of the queue to be independent of the connection pattern of client devices. For instance, many devices may connect at once, generating a large number of objects. If these objects were immediately added to the central database, the performance of all connections would suffer, and the connection time would increase. Phone calls are charged by duration, thus any system in which connection time increases as a function of load is not acceptable.

Another advantage of this separation is that machine or network failures are easily tolerated. In addition, the speed at which viewing objects are processed and added to the central database may be controlled by the service provider by varying the computer systems and their configurations to meet cost or performance goals.

Yet another advantage of this separation is that it provides a mechanism for separating data collected to improve service operations and data which might identify an individual viewer. It is important that such identifying data be kept private, both for legal reasons and to increase the trust individuals have in the service. For instance, the navigable attribute assigned to a viewing object containing the record of a viewer's viewing choices may contain only the viewer's zip code, meaning that further processing of those objects can construct no path back to the individual identity.

Periodic tasks are invoked on the server to cull these objects from the database and dispose of them as appropriate. For example, objects indicating viewer behavior are aggregated into an overall viewer behavior model, and information that might identify an individual viewer is discarded. Objects containing operational information are forwarded to an analysis task, which may cause customer service personnel to be alerted to potential problems. Objects containing transactional information are forwarded to transaction or commerce systems for fulfillment.

Any of these activities may result in new television viewing objects being added to the central database, or in existing objects being updated. These objects will eventually be transmitted to client devices. Thus, the television viewing management system is closed loop, creating a self-maintaining replicated database system 105 which can support any number of client systems.

Processing of Television Viewing Objects by Client Systems

Television viewing objects may contain the following types of information: television program descriptions and showing times; cable, satellite or broadcast signal originator information, such as channel numbering and identification; viewer preference information, such as actors, genre, showing times, etc.; software, such as enhanced database software, application software, operating system software, etc.; statistical modeling information such as preference vectors, demographic analysis, etc.; and any other arbitrary information that may be represented as digital data.

Methods Applied to Program Guide Objects

Program guide objects contain all information necessary for software running in the client system to tune, receive, record and view programs of interest to the user of the client system, selecting from among all available programs and channels as described by objects within the database.

This program guide information is updated on a regular basis by a service provider. This is handled by the provider acquiring program guide information in some manner, for instance, from a commercial supplier of such information or other sources of broadcast schedule information. This data is then processed using well-understood software techniques to reduce the information to a collection of inter-related viewing objects.

Referring again to FIG. 4, a typical relationship between program guide objects is shown. A television "network" object 407 is any entity which schedules and broadcasts television programming, whether that broadcast occurs over the air, cable, satellite, or other suitable medium. A television "program" object 401 is a description of any distinct segment of a television broadcast signal, such as a particular program, commercial advertisement, station promotion, opener, trailer, or any other bounded portion of a television signal. A "showing" object 406 is a portion of the broadcast schedule for a network on which a program is broadcast. A "channel map" object maps a network broadcast onto a particular broadcast channel for the medium being used; for instance, a channel map object for a satellite broadcast service would include information about the transponder and data stream containing the broadcast. Using the previously described methods, this program guide data is replicated from the central site to the client systems, where application software in the client systems use the data to manage television viewing.

The service provider may also provide aggregation viewing objects, which describe a set of program guide objects that are interrelated in some fashion. For instance, a "Star-Trek" collection might contain references to all program guide objects associated with this brand name. Clearly, any arbitrary set of programs may be aggregated in this fashion. Aggregation objects are similar to directories. For instance, the Star Trek collection might be found at "/showcases/Star Trek" in the hierarchical namespace. Aggregation objects are also program guide objects, and may be manipulated in a similar fashion, including aggregating aggregation objects, and so forth.

The client system may further refine the collection of program objects. In a system where programming may be captured to internal storage, each captured program is represented by a new program guide object, becoming available for viewing, aggregation, etc. Explicit viewer actions may also result in creation of program guide objects. For instance, the viewer may select several programs and cause creation of a new aggregation object.

This description of types of program guide objects is not meant to be inclusive; there may be many different uses and ways of generating program guide objects not herein described which still benefit from the fundamental methods of the invention.

Program guide objects are used by the application software in five ways:

1. In the simplest case, the viewer may wish to browse these objects to discern current or soon-to-be-available programming. The application software will map the object relationships described by the database to some form of visual and audible interface that is convenient and useful for the viewer. The viewer may indicate that a particular program is of interest, resulting in some application-specific action, such as recording the program to local storage when it is broadcast.

2. Application software may also directly process program guide objects to choose programs that may be of interest to the viewer. This process is typically based on an analysis of previously watched programming combined with statistical models, resulting in a priority ordering of all programs available. The highest priority programs may be processed in an application specific manner, such as recording the program to local storage when it is broadcast. Portions of the priority ordering so developed may be presented to the viewer for additional selection as in case 1.

One skilled in the art will readily appreciate that there is a great deal of prior art centered on methods for selecting programming for a viewer based on previous viewing history and explicit preferences, e.g., U.S. Pat. No. 5,758,257. The methods described in this application are unique and novel over these techniques as they suggest priorities for the capture of programming, not the broadcast or transmission of programming, and there is no time constraint on when the programming may be broadcast. Further details on these methods are given later in this description.

In general, explicit viewer choices of programming have the highest priority for capture, followed by programming chosen using the preference techniques described herein.

3. A client system will have a small number of inputs capable of receiving television broadcasts or accessing Web pages across a network such as an intranet or the Internet. A scheduling method is used to choose how each input is tuned, and what is done with the resulting captured television signal or Web page.

Figure 6:
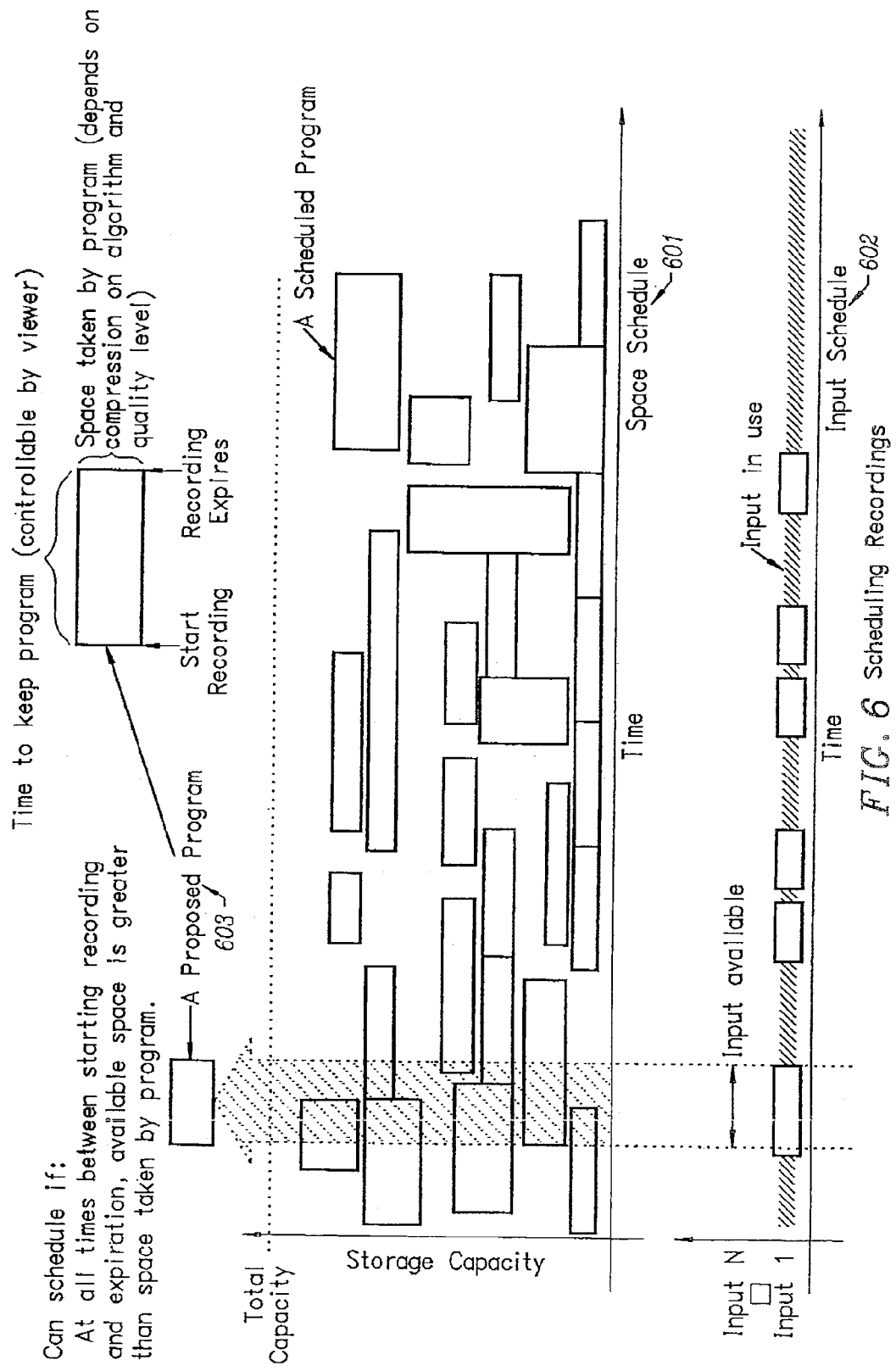
FIG. 6 is a block schematic diagram showing the scheduling of inputs and storage space for making recordings according to the invention.

Referring to FIG. 6, generally, the programs of interest to the viewer may be broadcast at any time, on any channel, as described by the program guide objects. Additionally, the programs of interest may be Web page Universal Resource Locators (URL) across a network, such as an intranet or the Internet. The channel metaphor is used to also describe the location, or URL, of a particular Web site or page.

A viewer, for example, can "tune" into a Web site by designating the Web site URL as a channel. Whenever that channel is selected, the Web site is displayed. A Web page may also be designated as a program of interest and a snapshot of the Web page will be taken and recorded at a predetermined time.

The scheduler accepts as input a prioritized list of program viewing preferences 603, possibly generated as per the cases above. The scheduling method 601 then compares this list with the database of program guide objects 604, which indicate when programs of interest are actually broadcast. It then generates a schedule of time 607 versus available storage space 606 that is optimal for the viewer's explicit or derived preferred programs. Further details on these methods are given later in this description.

4. When a captured program is viewed, the matching program guide object is used to provide additional information about the program, overlaid on the display using any suitable technique, preferably an On Screen Display (OSD) of some form. Such information may include, but is not limited to: program name; time, channel or network of original broadcast; expiration time; running time or other information.

5. When live programming is viewed, the application uses the current time, channel, and channel map to find the matching program guide object. Information from this object is displayed using any suitable technique as described above. The information may be displayed automatically when the viewer changes channels, when a new program begins, on resumption of the program after a commercial break, on demand by the viewer, or based on other conditions.

6. Using techniques similar to those described in case 2, application software may also capture promotional material that may be of interest to the viewer. This information may be presented on viewer demand, or it may be automatically inserted into the output television signal at some convenient point. For example, an advertisement in the broadcast program might be replaced by a different advertisement which has a higher preference priority. Using the time-warping apparatus, such as that described in U.S. Pat. No. 6,233,389, entitled "Multimedia Time Warping System," filed Jul. 30, 1998, it is possible to insert any stored program into the output television signal at any point. The time-warping apparatus allows the overlaid program to be delayed while the stored program is inserted to make this work.

Methods for Generating a List of Preferred Programs

Viewer preferences may be obtained in a number of ways. The viewer may request that certain programs be captured, which results in the highest possible priority for those programs. Alternatively, the viewer may explicitly express preferences using appurtenances provided through the viewer interface, perhaps in response to a promotional spot for a particular program, or even during the viewing of a program. Finally, preferences may be inferred from viewing patterns: programs watched, commercial advertisements viewed or skipped, etc.

In each case, such preferences must correspond to television viewing objects stored in the replicated database. Program objects included a wealth of information about each particular program, for example: title, description, director, producer, actors, rating, etc. These elements are stored as attributes attached to a program object.

Each individual attribute may result in the generation of a preference object. Such objects store the following information:

1. The type of the preference item, such as actor or director preference;
2. The weight of the preference given by the viewer, which might be indicated by multiple button presses or other means;
3. The statically assigned significance of the preference in relation to other preferences, for example, actor preference are more significant than director preferences;
4. The actual value of the preference item, for instance the name of the director.

Figure 5:
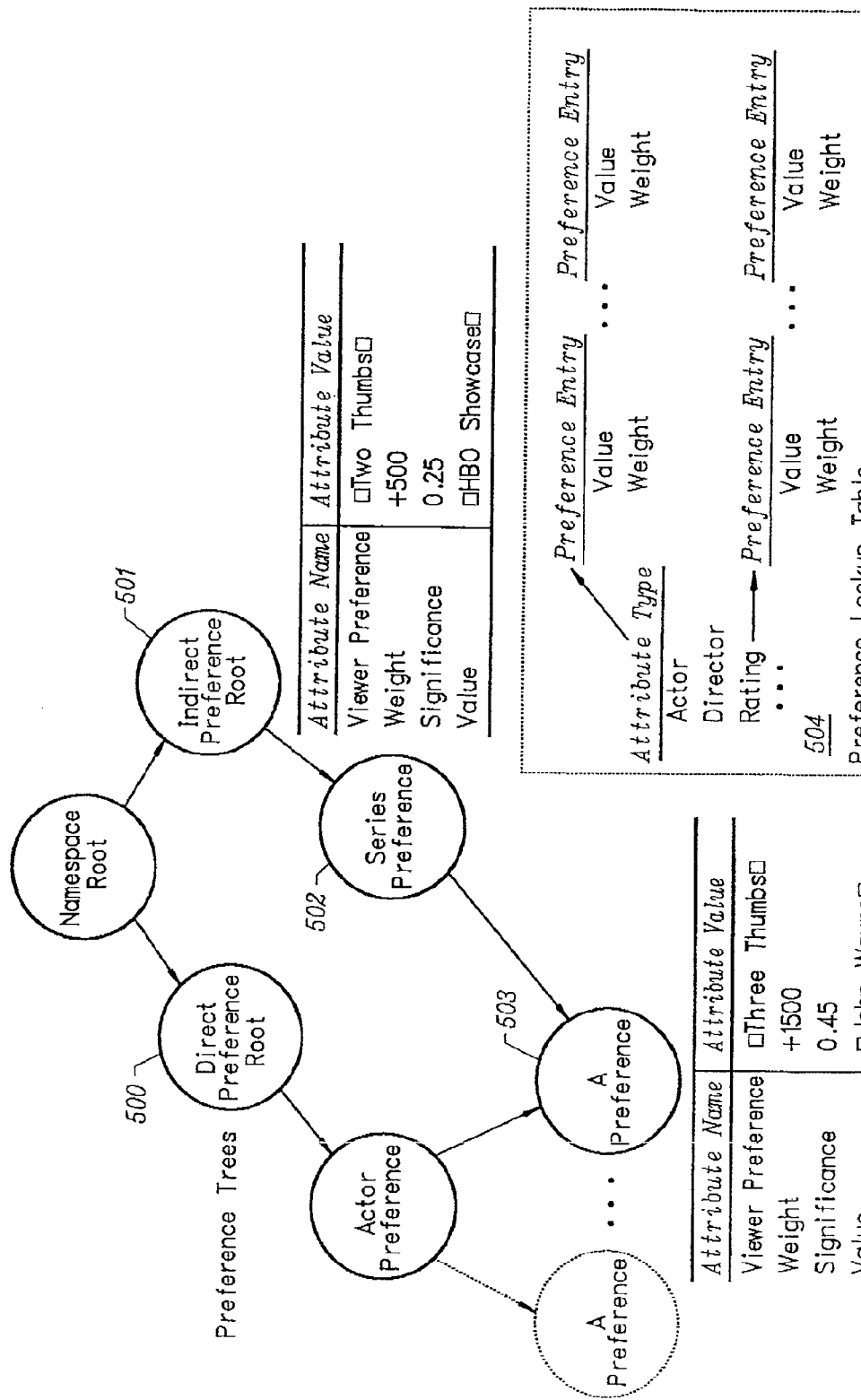
FIG. 5 is a block schematic diagram showing an example graph of relationships generated when processing viewer preferences to determine programs of interest according to the invention.

With respect to FIG. 5, preference objects are stored in the database as a hierarchy similar to that described for program guide objects, however this hierarchy is built incrementally as preferences are expressed 500. The hierarchy thus constructed is based on "direct" preferences, e.g., those derived from viewer actions or inferred preferences.

A similar hierarchy is developed based on "indirect" preferences pointing to the same preference objects 501. In general, indirect preferences are generated when preferences for aggregate objects are generated, and are used to further weight the direct preferences implied by the collection of aggregated objects. The preference objects referenced through the indirect preference hierarchy are generated or updated by enumerating the available program objects which are part of the aggregate object 502, and generating or updating preference objects for each attribute thus found.

The weight of a particular preference 503 begins at zero, and then a standard value is added based on the degree of preference expressed (perhaps by multiple button presses) or a standard value is subtracted if disinterest has been expressed. If a preference is expressed based on an aggregate viewing object, all preferences generated by all viewing objects subordinate to the aggregated object are similarly weighted. Therefore, a new weighting of relevant preference elements is generated from the previous weighting. This process is bounded by the degree of preference which is allowed to be expressed, thus all weightings fall into a bounded range.

In a preferred embodiment of the invention, non-linear combinations may be used for weighting a preference item. For instance, using statistical models provided by the central site, the client may infer that a heavily weighted preference for three attributes in conjunction indicates that a fourth attribute should be heavily weighted as well.

The list of preferred programs is generated as follows:

1. A table 504 is constructed which lists each possible program object attribute, and any preference objects for that attribute that are present are listed in that entry.
2. If the preference item is a string, such as an actor name, a 32-bit digital signature for that string is calculated using a 32-bit CRC algorithm and stored with the table item, rather than the string itself. This allows for much faster scanning of the table as string comparisons are avoided, at the slight risk of two different strings generating the same digital signature.
3. For each program object in the database, and for each attribute of that program, the attribute is looked up in the table. If present, the list of preference objects for that attribute is examined for a match with the attribute of the current program object. If a match occurs, the weight associated with that preference object is added to weighting associated with the program object to generate a single weight for the program.
4. Finally, the program objects are rank-ordered based on the overall weighting for each program, resulting in a list of most-preferred to least-preferred programs.

Given this final prioritized list, a recording schedule is generated using the methods described below, resulting in a collection of recorded programs of most interest to the viewer.

Methods Applied to Scheduling Recording Versus Available Storage Space

As has been described previously, recorded programs will in general have an expiration date, after which the recorded program is removed from client storage. The viewer may at any time indicate that a program should be saved longer, which delays expiration by a viewer-selected interval. The invention views the available storage for recording programs as a "cache"; unviewed programs are removed after a time, based on the assumption they will not be watched if not watched soon after recording. Viewed programs become immediate candidates for deletion, on the assumption they are no longer interesting.

With proper scheduling of recording and deletion of old programs, it is possible to make a smaller storage area appear to be much larger, as there is an ongoing flushing of old programs and addition of new programs. Additionally, if resources are available, recordings may be scheduled of programs based on inferred preferences of the viewer; these are called "fuzzy" recordings. This results in a system where the program storage area is always "full" of programming of interest to the viewer; no program is removed until another program is recorded in its place or the viewer explicitly deletes it.

Additionally, the viewer may select a program for recording at any time, and the recording window may conflict with other scheduled recordings, or there may not be sufficient space obtainable when the program must be recorded. The invention includes unique and novel methods of resolving such conflicts.

Conflicts can arise for two reasons: lack of storage space, or lack of input sources. The television viewing system described herein includes a fixed number of input sources for recording video and a storage medium, such as a magnetic disk, of finite capacity for storing the recorded video. Recording all television programs broadcast over any significant period of time is not possible. Therefore, resolving the conflicts that arise because of resource limitations is the key to having the correct programs available for viewing.

Referring again to FIG. 6, the invention maintains two schedules, the Space Schedule 601 and the Input Schedule 602. The Space Schedule tracks all currently recorded programs and those which have been scheduled to be recorded in the future. The amount of space available at any given moment in time may be found by generating the sum of all occupied space (or space that will be occupied at that time) and subtracting that from the total capacity available to store programs. Programs scheduled for recording based on inferred preferences ("fuzzy" recordings) are not counted in this calculation; such programs automatically lose all conflict decisions.

A program may be recorded 603 if at all times between when the recording would be initiated and when it expires, sufficient space is available to hold it. In addition, for the duration of the program, there must be an input available from which to record it. The Input Schedule 602 tracks the free and occupied time slots for each input source. In a preferred embodiment of the invention, the input sources may not be used for identical services, e.g., one input may be from a digital television signal and another from an analog television signal with different programming. In this case, only those inputs from which the desired program can be recorded are considered during scheduling.

Figure 7:
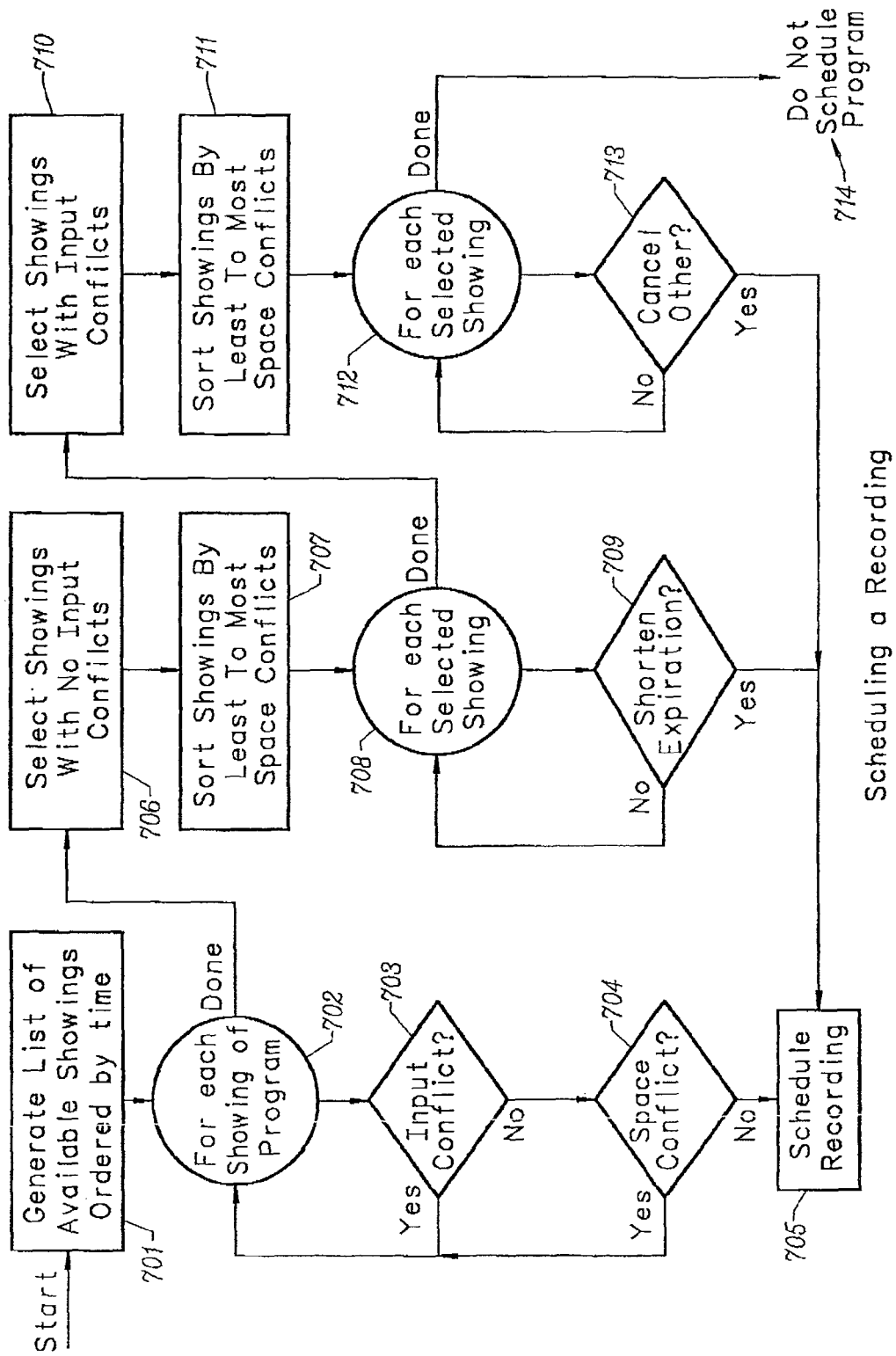
FIG. 7 is a flowchart showing the steps taken to schedule a recording using the mechanism depicted in FIG. 6 according to the invention.

With respect to FIG. 7, a flowchart is shown describing the steps taken to schedule a recording in the preferred embodiment. First, an ordered list of showings of the program of interest are generated 701. Although a preferred embodiment of the invention orders these showings by time, such that the recording is made as soon as possible, any particular ordering might be chosen. Each showing in this list 702 is then checked to see if input 703 or space 704 conflicts occur as described above. If a showing is found with no conflicts, then the program is scheduled for recording 705.

Otherwise, a preferred embodiment of the invention selects only those showings of the program which have no input conflicts 706. Referring again to FIG. 6, one can see that over the lifetime of a recording the amount of available space will vary as other programs are recorded or expire. The list of showings is then sorted, preferably by the minimum amount of available space during the lifetime of the candidate recording. Other orderings may be chosen.

Referring again to FIG. 7, for each candidate showing, the viewer is presented with the option of shortening the expiration dates on conflicting programs 708, 709. This ordering results in the viewer being presented these choices in order from least impact on scheduled programs to greatest 707; there is no requirement of the invention that this ordering be used versus any other.

Should the viewer reject all opportunities to shorten expiration times, the final step involves selecting those showings with input conflicts 710, and sorting these showings as in the first conflict resolution phase 711. The viewer is then presented with the option to cancel each previously scheduled recording in favor of the desired program 712, 713. Of course, the viewer may ultimately decide that nothing new will be recorded 714.

In a preferred embodiment of the invention, all conflicts are resolved as early as possible, giving the viewer more control over what is recorded. When the viewer makes an explicit selection of a program to record, the algorithm described in FIG. 7 is used to immediately schedule the recording and manage any conflicts that arise.

Once an explicit selection has been made, and the viewer informed that the recording will be done, it will not be canceled without explicit approval of the viewer.

Fuzzy recordings are periodically scheduled by a background task on the client device. Given the prioritized list of preferred programs as described earlier, the background scheduler attempts to schedule each preferred program in turn until the list is exhausted or no further opportunity to record is available. A preferred program is scheduled if and only if there are no conflicts with other scheduled programs. A preferred program which has been scheduled may be deleted under two conditions: first, if it conflicts with an explicit selection, and second, if a change in viewer preferences identifies a higher priority program that could be recorded at that time.

A further complication arises when handling aggregate viewing objects for which recording is requested. If conflict resolution was handled according to the method above for such objects, a potentially large number of conflicts might be generated, leading to a confusing and frustrating experience for the viewer in resolving the conflicts. Thus, when aggregate objects are chosen for recording, conflicts are automatically resolved in favor of the existing schedule.

In a preferred embodiment of the invention, conflicts resulting from the recording of aggregate objects will be resolved using the preference weighting of the programs involved; if multiple conflicts are caused by a particular program in the aggregate object, it will only be recorded if its preference exceeds that of all conflicting programs.

Methods Applied to Software Objects

The client system requires a complex software environment for proper operation. An operating system manages the interaction between hardware devices in the client and software applications which manipulate those devices. The television viewing object database is managed by a distinct software application. The time-warping software application is yet another application.

It is desirable to add new features or correct defects in these and other software subsystems which run on the client hardware device. Using the methods described herein, it is possible to replicate viewing objects containing updated software modules into the client system database. Once present in the client system database, the following unique and novel methods are used to install the updated software and cause the client system to begin executing the new software.

The software environment of the device is instantiated as a sequence of steps that occur when power is first applied to the device, each step building up state information which supports proper application of the following step. The last step launches the applications which manage the device and interact with the viewer. These steps are:

1. A read-only or electrically programmable memory in the device holds an initial bootstrap sequence of instructions. These instructions initialize low-level parameters of the client device, initialize the disk storage system, and load a bootstrap loader from the disk into memory, to which execution is then passed. This initial bootstrap may be changed if it resides in an electrically programmable memory.
2. The second stage boot loader then locates the operating system on the disk drive, loads the operating system into memory, and passes execution to the operating system. This loader must exist at a specific location on the disk so as to be easily located by the initial loader.

The operating system performs necessary hardware and software initialization. It then loads the viewing object database software from the disk drive, and begins execution of the application. Other application software, such as the time-warping software and viewer interaction software, are also loaded and started. This software is usually located in a separate area on the disk from the object database or captured television programs.

Ideally, new software would be installed by simply copying it to the appropriate place on the disk drive and rebooting the device. This operation is fraught with danger, especially in a home environment. Power may fail while copying the software, resulting in an inconsistent software image and potential operating problems. The new software may have defects which prevent proper operation. A failure may occur on the disk drive, corrupting the software image.

Although the methods of this invention have referred to a disk drive, one skilled in the art will readily appreciate that the methods described here apply generally to any persistent storage system. A disk drive, and other persistent storage systems, are typically formatted into a sequence of fixed-size blocks, called sectors. "Partitions" are sequential, non-overlapping subsets of this sequence which break up the storage into logically independent areas.

Figure 8:
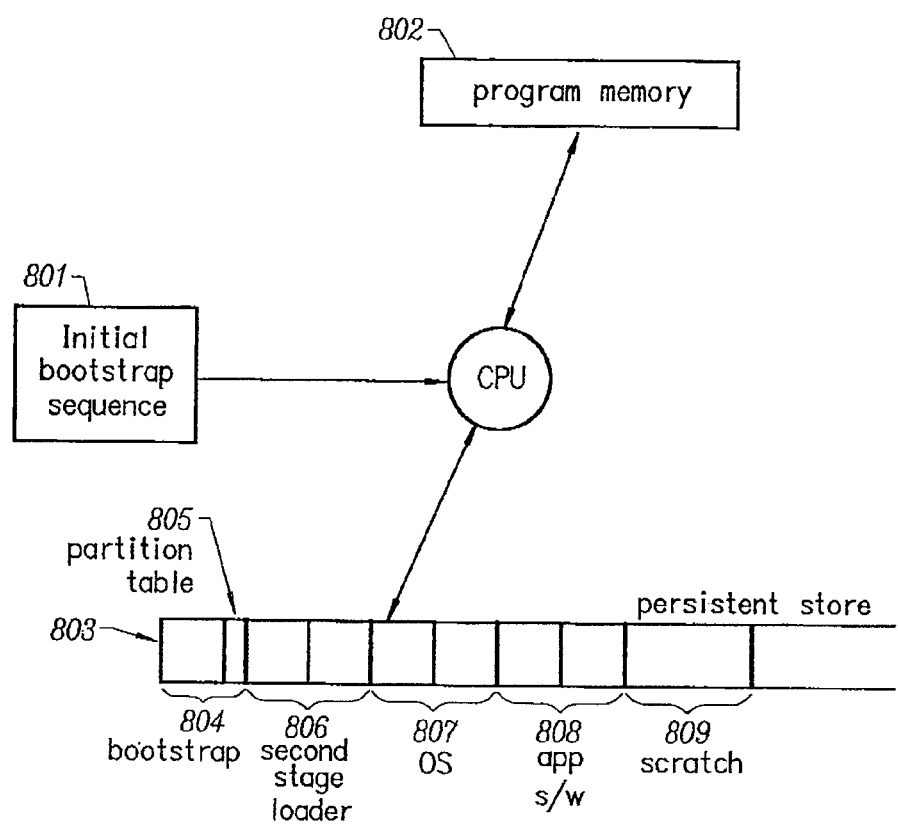
FIG. 8 is a block schematic diagram of a preferred embodiment of the invention showing the bootstrap system configuration according to the invention.

With respect to FIG. 8, the invention maintains a sector of information at a fixed location on the disk drive 803 called the "boot sector" 804. The boot sector 804 contains sufficient information for the initial bootstrap 801 to understand the partitioning of the drive 803, and to locate the second stage boot loader 806.

The disk is partitioned into at least seven (7) partitions. There are two (2) small partitions dedicated to holding a copy of the second stage boot loader 806, two (2) partitions holding a copy of the operating system kernel 807, two (2) partitions containing a copy of the application software 808, and a partition to be used as scratch memory 809. For duplicated partitions, an indication is recorded in the boot sector 805 in which one of the partitions is marked "primary", and the second is marked "backup".

One skilled in the art will readily appreciate that, although two partitions are described herein for redundancy, triple, quadruple or greater degrees of redundancy can be achieved by creating more duplicated partitions.

Figure 9A:
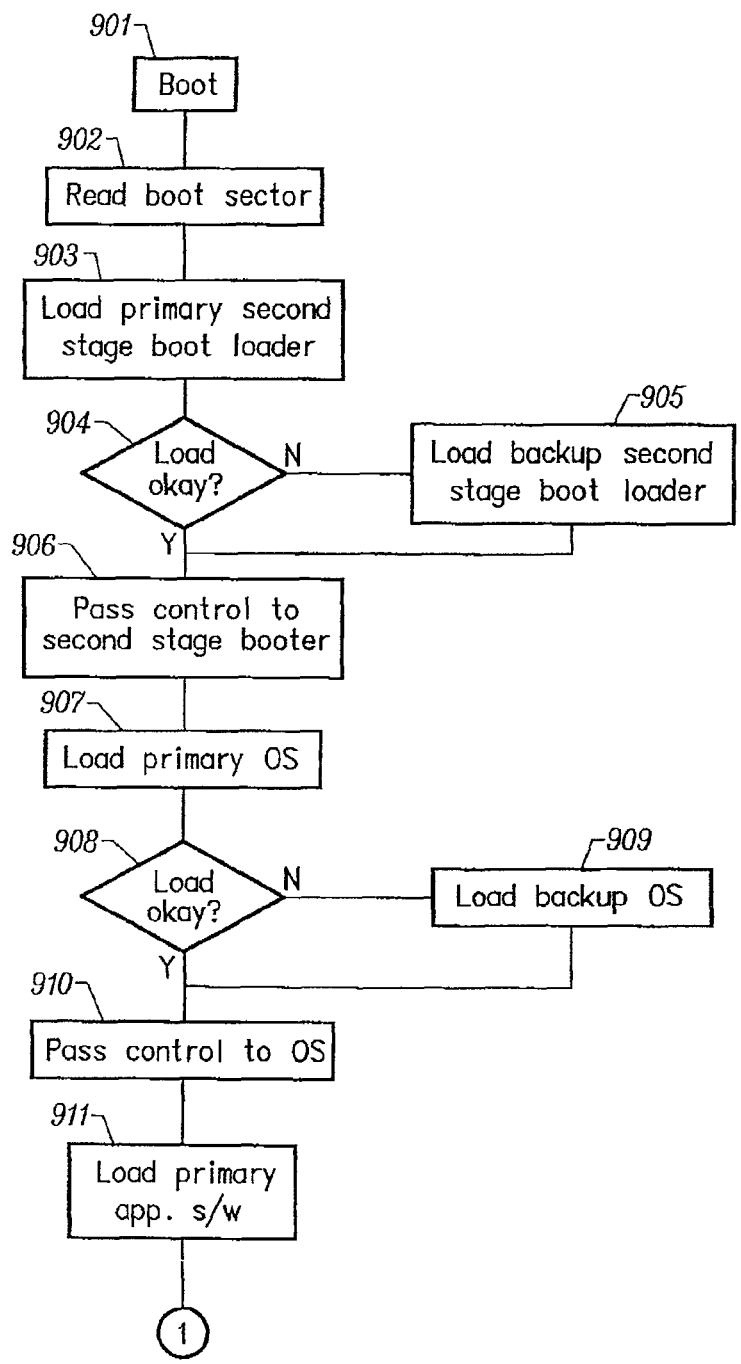
FIG. 9*a* is a block schematic diagram of the decision flowchart for the bootstrap component according to the invention.
Figure 9B:
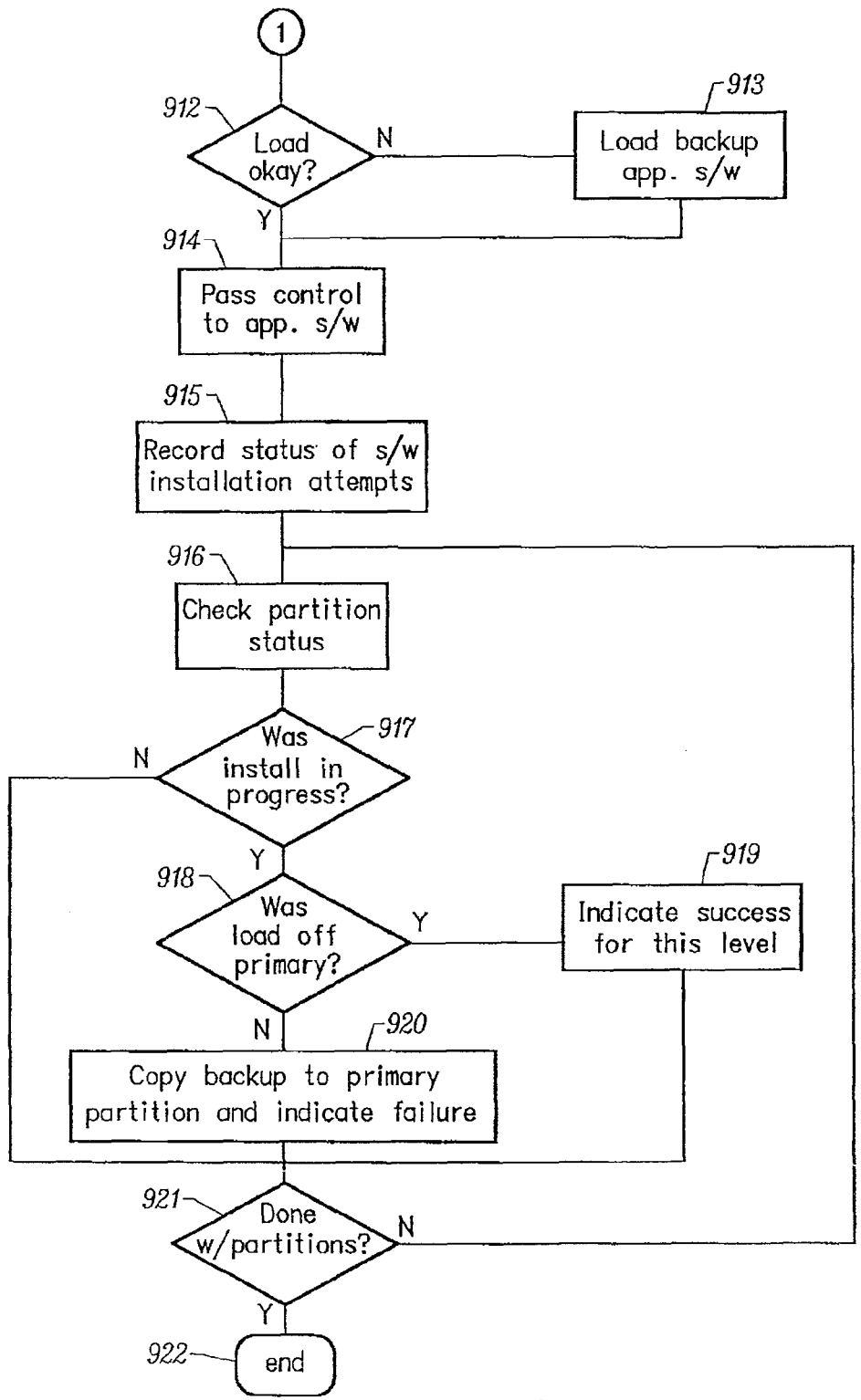
FIG. 9*b* is a block schematic diagram of the decision flowchart for the bootstrap component according to the invention.

With respect to FIGS. 9a and 9b, on boot 901, the initial bootstrap code reads the boot sector 902, scans the partition table and locates the "primary" partition for the second stage boot loader. It then attempts to load this program into memory 903. If it fails 904, for instance, due to a failure of the disk drive, the boot loader attempts to load the program in the "backup" partition into memory 905. Whichever attempt succeeds, the boot loader then passes control to the newly loaded program, along with an indication of which partition the program was loaded from 906.

Similarly, the second stage boot loader reads the partition table and locates the "primary" operating system kernel 907. If the kernel can not be loaded 908, the "backup" kernel is loaded instead 909. In any case, control is passed to the operating system along with an indication of the source partition, along with the passed source partition from above 910.

Finally, the operating system locates the "primary" partition containing application software and attempts to load the initial application 911. If this fails 912, then the operating system locates the "backup" partition and loads the initial application from it 913. An indication of the source partition is passed to the initial application, along with the source partition information from the previous steps. At this point, application software takes over the client system and normal viewing management behavior begins 914.

This sequence of operations provides a reasonable level of protection from disk access errors. It also allows for a method which enables new software at any of these levels to be installed and reliably brought into operation.

An "installer" viewing object in the object database is used to record the status of software installation attempts. It records the state of the partitions for each of the three levels above, including an indication that an attempt to install new software is underway 915. This operation is reliable due to the transactional nature of the database.

Figure 10:
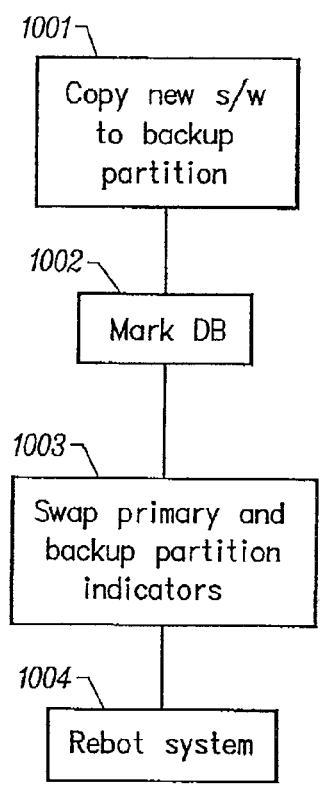
FIG. 10 is a block schematic diagram of the decision flowchart for the software installation procedure according to the invention.

Referring to FIG. 10, installing a new software image at any of the three levels is handled as follows: the new software image is first copied into the appropriate backup partition 1001, and an indication is made in the database that a software installation is underway 1002. The primary and backup partition indications in the partition table are then swapped 1003, and the system rebooted 1004. Eventually, control will be passed to the initial application.

Referring again to FIG. 9b, the first task of this application is to update the installer object. For each level 921, 922, the application checks if an installation was in process 916, 917, and verifies that the level was loaded off of the primary partition 918. If so, the installation at that level was successful, and the installer object is updated to indicate success for that level 919. Otherwise, the application copies the backup partition for that level over the primary partition and indicates failure in the installer object for that level 920. Copying the partition insures that a backup copy of known good software for a level is kept available at all times.

In a preferred embodiment of the invention, finalization of the installation for the top application level of software may be delayed until all parts of the application environment have been successfully loaded and started. This provides an additional level of assurance that all parts of the application environment are working properly before permanently switching to the new software.

Methods Applied to Operations Status Objects

Operations status objects are a class of viewing object in which information about the usage, performance and behavior of the client system is recorded. These objects are collected by the central site whenever communication with the central site is established.

The following operations status indicators are recorded for later collection along with a time stamp:

1. Viewer actions, primarily pressing buttons on a remote control device, are recorded. Each "button press" is recorded along with the current time, and any other contextual information, such as the current viewer context. Post-processing of this object at the central site results in a complete trace of viewer actions, including the context in which each action is taken.
2. Automatic actions, such as beginning or ending the recording of a program, or choosing a program to record based on viewer preferences, are recorded. In addition, deletion of captured programs is recorded. Post-processing of this object at the central site results in a complete trace of program capture actions taken by the client system, including the programs residing in the persistent store at any point in time.
3. Software installation actions, including reception, installation, and post-reboot results are recorded.
4. Hardware exceptions of various kinds, including but not limited to: power fail/restart, internal temperature profile of the device, persistent storage access errors, memory parity errors and primary partition failures.

Since all actions are recorded along with a time stamp, it is possible to reconstruct the behavior of the client system using a linear time-based ordering. This allows manual or automatic methods to operate on the ordered list of events to correlate actions and behaviors. For instance, if an expected automatic action does not occur soon after rebooting with new software, it may be inferred that the new software was defective.

Processing of Television Viewing Objects by Central Site Systems

Sources of Television Viewing Objects

A client system has a single source of television viewing objects: the central site. The central site object database has many sources of television viewing objects:

1. Program guide information obtained from outside sources is processed to produce a consistent set of program guide objects, indicating "programs", "showings", "channels", "networks" and other related objects. This set of objects will have dependencies ("channels" depend on "networks", "showings" depend on "programs") and other interrelationships. When a complete, consistent set of objects is ready, it is added to the database as an atomic operation.
2. New software, including new applications or revisions of existing software, are first packaged into "software" viewing objects. As above, the software may have interdependencies, such as an application depending on a dynamically loaded library, which must be reflected in the interrelationships of the software objects involved. In another example, there may be two types of client systems in use, each of which requires different software objects; these software objects must have attributes present indicating the type of system they are targeted at. Once a consistent set of objects is available, it is added to the database as an atomic operation.
3. Each client system has a unique, secret key embedded within it. The public key matching this secret key is loaded into a "client" management object, along with other interesting information about the client, such as client type, amount of storage in the system, etc. These objects are used to generate authentication objects as necessary.
4. Aggregation program guide objects are added in a similar fashion. In this case, however, the aggregation object must refer to primitive program guide objects already present in the database. Also attached to the aggregation object are other objects, such as a textual description, a screen-based icon, and other informational attributes. Once a consistent set of ancillary objects to the aggregation is available, it is added to the database as an atomic operation.
5. Data collected from client systems.

It should be clear that there may be any number of sources of viewing objects, and this enumeration simply shows the most basic possible sources.

Operations on Television Viewing Objects

There are a large number of possible operations on the central television viewing object database. The following examples are meant to show the type of processing that may be performed, however the potential operations are not limited to these examples:

1. Using various viewing objects, a number of interesting statistical analysis tasks may be performed:

A) By examining large numbers of uploaded operations status objects, it is possible to perform extensive analysis of hardware reliability trends and failure modes. For instance, it is possible to correlate internal temperature with expected MTBF (Mean Time Between Failures) of client devices.

B) By examining large numbers of uploaded viewing information, it is possible to derive demographic or psychographic information about various populations of client devices. For example, it is possible to correlate TV programs most watched within specific zip codes in which the client devices reside.

C) Similarly, by examining large numbers of viewing information objects, it is possible to generate "rating" and "share" values for particular programs with fully automated methods, unlike existing program rating methods.

D) There are many other examples of statistical analysis tasks that might be performed on the viewing object database; these examples are not meant to limit the applicability of the invention, but to illustrate by example the spectrum of operations that might be performed.

2. Specialty aggregation objects may be automatically generated based on one or more attributes of all available viewing objects. Such generation is typically performed by first extracting information of interest from each viewing object, such as program description, actor, director, etc., and constructing a simple table of programs and attributes. An aggregate viewing object is then generated by choosing one or more attributes, and adding to the aggregate those programs for which the chosen attributes match in some way. These objects are then included in the slices generated for transmission, possibly based on geographic or other information. Some example aggregates that might be created are:

A) Aggregates based on events, such as a major league football game in a large city. In this case, all programs viewable by client devices in or around that city are collected, and the program description searched for the names of the teams playing, coaches names, major player's names, the name of the ballpark, etc. Matching program objects are added to the aggregate, which is then sliced for transmission only to client devices in regions in and around the city.

B) Aggregates based on persons of common interest to a large number of viewers. For instance, an aggregate might be constructed of all "John Wayne" movies to be broadcast in the next week.

C) Aggregates based on viewing behavior can be produced. In this case, uploaded viewing objects are scanned for elements of common interest, such as types of programs viewed, actual programs viewed, etc. For example, a "top ten list" aggregate of programs viewed on all client devices in the last week might be generated containing the following week's showing of those programs.

D) Aggregates based on explicit selections by viewers. During viewing of a program, the viewer might be presented with an opportunity to "vote" on the current program, perhaps on the basis of four perceived attributes (storyline, acting, directing, cinematography), which generates viewing objects that are uploaded later. These votes are then scanned to determine an overall rating of the program, which is transmitted to those who voted for their perusal.

E) There are many other examples of how the basic facilities of this invention allow the service operator to provide pre-sorted and pre-selected groups of related programs to the user of the client device for perusal and selection. These examples are not meant to limit the applicability of the invention, but to illustrate by example the spectrum of operations that might be performed.

3. Manual methods may also be used to generate aggregate objects, a process sometimes called "authoring". In this case, the person creating the aggregate chooses programs for explicit addition to the aggregate. It is then transmitted in the same manner as above.

Clearly, aggregation program objects may also permit the expression of preferences or recording of other information. These results may be uploaded to the central site to form a basis for the next round of aggregate generation or statistical analysis, and so on.

This feedback loop closes the circuit between service provider and the universe of viewers using the client device. This unique and novel approach provides a new form of television viewing by providing unique and compelling ways for the service provider to present and promote the viewing of television programs of interest to individuals while maintaining reliable and consistent operation of the service.

Remote Client System Control

Many in-home consumer electronics devices already contain mass storage, with many more to come. The amount of storage available in these devices is already staggering, and there is no end in sight to the "double each year" rule-of-thumb for disk drives. Other types of storage media are also getting fatter every year, including: CompactFlash, SmartMedia, Zip, Flash Memory Sticks, MicroDrive, PocketDrive, and SuperDisk.

The obvious control of this storage is by the consumer, storing their own TV shows, music, pictures, etc. A less obvious use, but one that will continue to grow in application and importance, is a service-provider's control of this storage. There will be a continually growing desire for a service provider to have control over storage that is physically possessed by the consumer.

Figure 11:
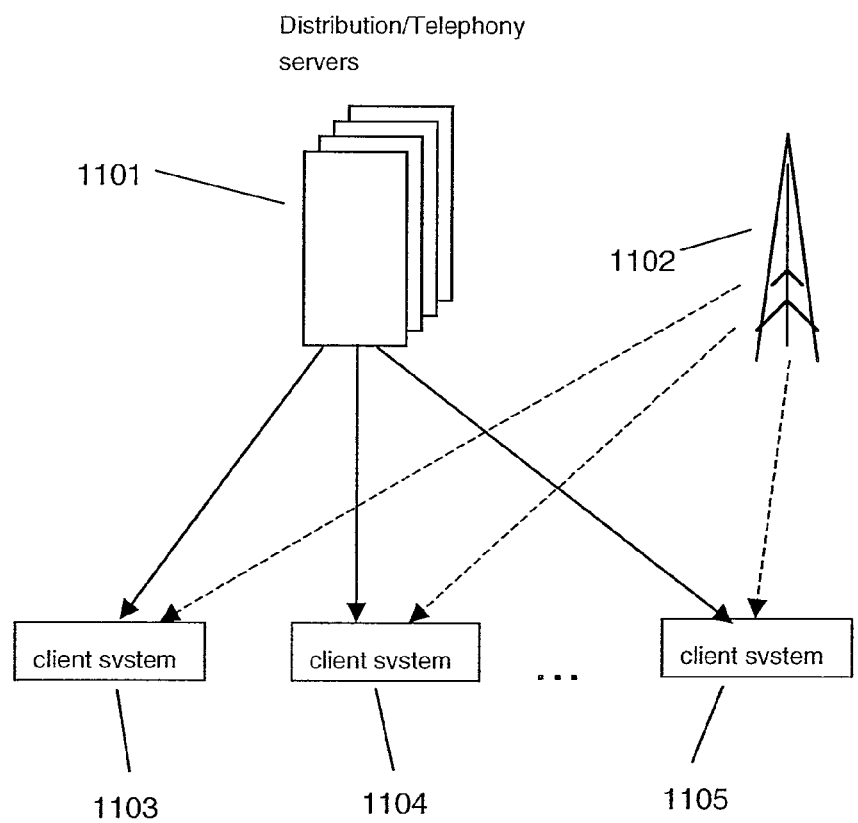
FIG. 11 is a block schematic diagram of a preferred embodiment of the invention distributing content information to a plurality of client systems that record content from a broadcast signal based on remote commands from a server according to the invention.

Referring to FIG. 11, the invention's distribution/telephony servers 1101 have the ability to send objects to client systems 1103, 1104, 1105, that command the client system to perform a function, e.g., record a specific program from a broadcaster 1102 or capture content that the service directs the client system to capture. Every function that a user can control in addition to maintenance and control aspects of a client system are encompassed in a set of objects called capture requests.

Client systems 1103, 1104, 1105, have the ability to capture and record any type of multimedia material (TV shows, movies, advertisements, product and service offerings, music, radio, audio, ebooks, etc.) that is transmitted across a broadcast or communications link.

Capture request objects are sent from the distribution/telephony servers 1101 to individual or groups of client systems 1103, 1104, 1105. The following are some examples of the power of capture requests:

Capture requests allow the invention's service to schedule recordings on client systems. These recordings can be for video or data content.

Capture requests specify the recordings using program names and optionally an Affiliate, e.g., NBC. Specifying an affiliate limits the recordings to the specified affiliate's stations. If the program is shown on another affiliate's station, it is not recorded.

Capture requests have the ability to schedule single recordings or schedule recordings of all of the showings of a series.

Capture requests have the ability to set attributes of the resulting recordings:

Recording disk location—If the recording will occupy the user's disk space on the client system or the client system's hidden space on the disk (storage device).

Recording tuner priority—Whether these recordings will cause other programs to not be recorded because of tuner conflicts (on client systems having multiple input tuners).

Recording keep time—The suggested minimum length of time that a recording should remain on the client system's disk before other recordings should delete it.

Recording quality—The recording quality of the recording, e.g., low, good, high, best.

Capture requests have the ability to create a season pass for a program series. A season pass will record every showing of a program on a specified channel Capture requests can specify an expiration date. This date is used to determine the date, after which, recordings are not scheduled. Also after the expiration date, the capture requests are removed from the client system's disk.

The invention's service has the ability to modify a capture request, and the client system will reschedule all of the recordings from the previous capture request with the new options.

The invention's service has the ability to target specific client systems to receive a particular capture request. This allows the invention to schedule recordings on a subset of all of client systems.

Figure 12:
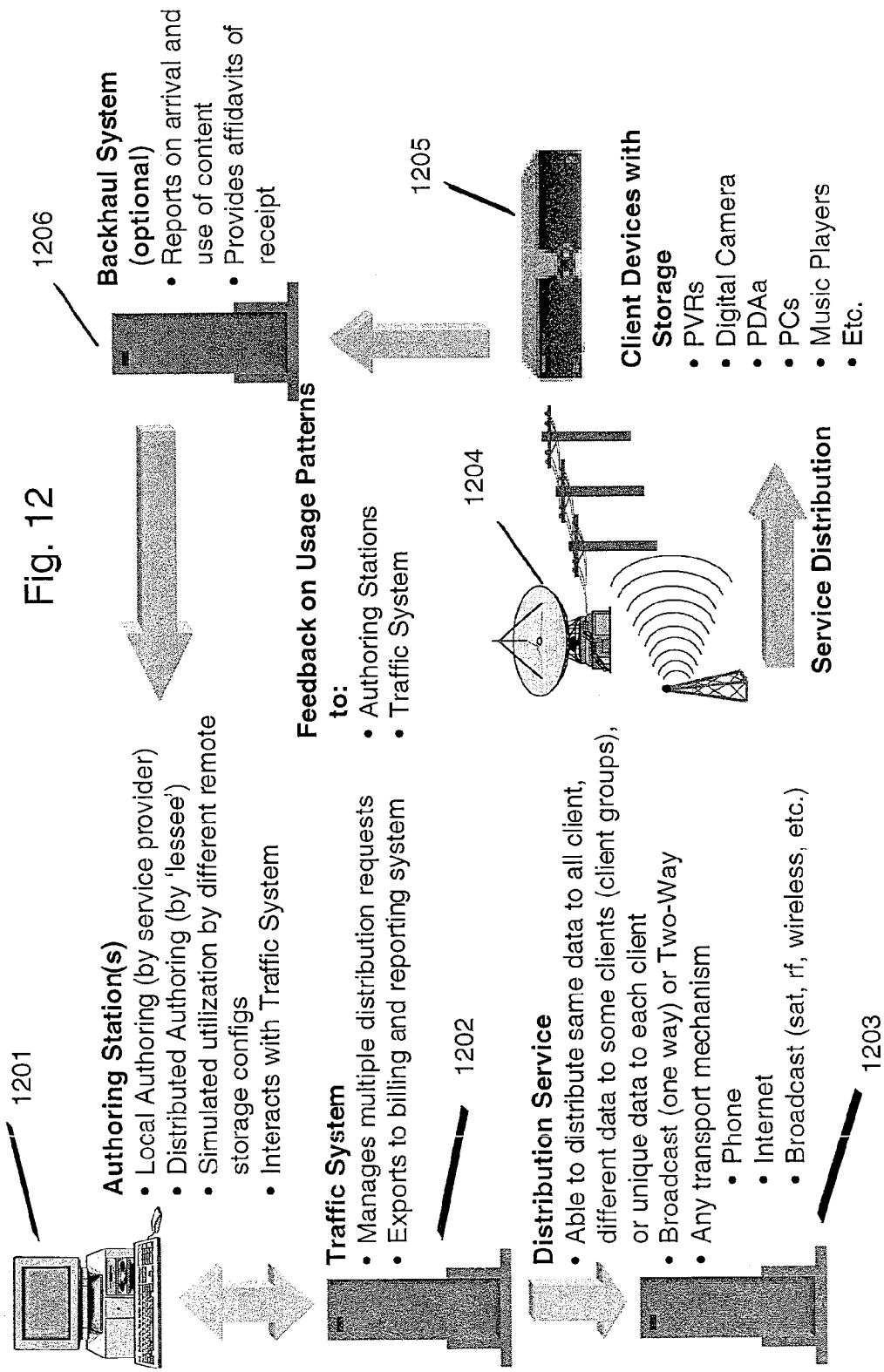
FIG. 12 is a block schematic diagram showing an authoring and distribution system for controlling a client system's storage and recording behavior according to the invention.

With respect to FIG. 12, the mechanism and process for remote-control of storage on client systems can be segmented functionally into three parts:

1) Front-End Service 1201: This part is where capture requests get created using authoring tools, where they are previewed, and how they are distributed to client devices 1205. This is also where decisions about how the client-side storage is allocated (partitioned) and may be authored and changed over time. The policy for how the storage gets used is authored here at the front end.

2) Client system 1205: The client system 1205 is responsible for implementing the storage partition as directed by the service, for capturing media or objects per capture requests, and for implementing the rotation and expiration mechanisms. The client itself holds no policy about how the storage gets used; it simply implements a generic mechanism and the policy is given by the service 1201.

3) Back-End Service 1206: Client systems 1205 may report back the success or failure of requests by the service 1201, how received data/media is used, or may even send back data/media which is redistributed via the distribution service 1202, 1203, 1204 (e.g. picture, video, music sharing services).

Transparent "Pull" that Looks and Feels Like "Push"

To the client system 1205, this looks like the service "pushed" content (data, media, whatever) down. In actuality, the service merely directed the client device to pull content, or to capture it. This is transparent to the user of the client system 1205.

Remote Authoring of Capture Requests

Users of the client system 1205 expect to be able to have full control over the content stored on the client system 1205, e.g., telling the client system 1205 what to capture and when to capture the content, when to delete content, etc. The capture request mechanism gives this same level of control to the remote author.

The authoring tool 1201 allows the author to create a capture request object. The schema for this object defines metadata that specifies:

Where the data/media is to be captured (in the form of a station/channel, URL, or any other pointer to available media).

When the data/media is to be captured (in the case of broadcast or multicast content).

Priority of the capture request—How important it is for the client system to preempt other activities in order to perform this request.

Priority of the content—If local storage is unavailable, what other content should be displaced to make room.

Presentation of content—How in the client system/user-experience should this content be presented (rotation policy, display policy, expiration, view once/many, eligibility, etc.).

Client-side targeting—The request can include any number of criteria that must be met in order for the request to be valid. For example, the request might say "only execute on clients that have these capabilities" or "only execute on clients that already have this content available." The capabilities can be described using an arbitrarily sophisticated query mechanism.

Remote Control of Space Allocation

In many cases, it is desirable to partition the storage on the client system such that some of the storage is left under the total control of the user and some of the storage is under total control of the service.

The invention allows this partitioning to be changed at any time by the service. This is useful in allowing for changes in policy in the future (e.g., to give some space back to the user, or take some away) or to account for new storage configurations (e.g., when new, bigger configurations or upgrades become available).

The mechanism allows an author at the service to create a "Partition Table" which specifies how much storage should be allocated based on size of storage and particular client configuration.

Control of which Clients Receive which Capture Requests

When capture requests are distributed via the service 1202, 1203, 1204, the distribution service 1203 controls which client systems receive the capture requests.

Service-side tools allow specification by serial number, by client capability, by client service tier, etc. A table is maintained which puts each client device into one or more capture request groups. A given capture request can then be assigned to one or more of these groups.

Mechanism Separated from Policy

Note that this entire system is designed to keep policy out of the client system. All policy is determined by the author or automatically by the service. The client system merely executes directives or requests from the service.

Applications of Remote-Controlled Storage

Remotely controlling the storage on a client system is useful in many application such as:
- Promotions
- Mall
- Cineplex
- Music
- Pictures
- Video on Demand
- Software
- Games
- Personal News, Weather, Sports . . . .

Varieties of Remote-Controlled Storage

Remote-controlled storage can take on many forms:
- Disk Drives vs. All Storage Mediums: Although hard disk drives are the obvious application of remote-controlled storage, other mediums would work equally well. A music service could "push" promotional music onto a personal music device every time the device is hot synced.
- Always On vs. Sometimes On vs. Rarely On: This mechanism applies equally well to systems that are always connected to the service (e.g., with an always-on internet connection), client systems that connect to the service periodically (e.g., nightly connect via phone line), and those systems that only rarely connect (e.g., when a PDA or camera is hot-synced).

Examples of Embodiments

Some examples of embodiments described herein are as follows.

According to an embodiment, a process for remotely controlling storage and the operations of a client system comprises the steps of: providing a plurality of client systems; authoring a capture request; sending said capture request from a server to a client system; wherein said capture request is received by a client system; wherein said capture request instructs said client system to record specific content from a television broadcast signal; and providing recording means on said client system for tuning to said television broadcast signal and recording said specific content.

In an embodiment, said capture request instructs said client system the time and channel to schedule said recording of specific content. In an embodiment, said specific content is video or data content broadcast across said television broadcast signal. In an embodiment, said capture request specifies said specific content using the program name and optionally an Affiliate name. In an embodiment, said capture request schedules single recordings or schedules recordings of all of the showings of a series. In an embodiment, said capture request sets attributes of said recorded specific content. In an embodiment, said capture request sets the location of said recorded specific content on said client system's storage device; wherein said location is either user storage space or system storage space.

In an embodiment, said capture request sets recording tuner priority level when said client system has multiple input tuners. In an embodiment, said capture request specifies a suggested minimum length of time that a recording should remain on the client system's storage device. In an embodiment, said capture request specifies a recording quality setting of a recording. In an embodiment, said capture request instructs said client system to create a season pass for a program series, and wherein a season pass records every showing of a program on a specified channel. In an embodiment, said capture request specifies an expiration date for itself.

In an embodiment, said server modifies a capture request that said client system has previously received. In an embodiment, said server targets specific client systems to receive a particular capture request. In an embodiment, said capture request specifies content to be transferred from said client system to a device connected to said client system.

According to an embodiment, a process for remotely controlling storage allocations of a client system comprises the steps of: providing a plurality of client systems; authoring an operational request; sending said operational request from a server to a client system; wherein said operational request is received by a client system; wherein said operational request instructs said client system to allocate user space and system space areas on said client system's storage device; and providing storage allocation means on said client system for partitioning said local storage device as specified in said operational request.

According to an embodiment, an apparatus for remotely controlling storage and the operations of a client system comprises: a plurality of client systems; a module for authoring a capture request; a module for sending said capture request from a server to a client system; wherein said capture request is received by a client system; wherein said capture request instructs said client system to record specific content from a television broadcast signal; and recording means on said client system for tuning to said television broadcast signal and recording said specific content.

According to an embodiment, an apparatus for remotely controlling storage allocations of a client system comprises: a plurality of client systems; a module for authoring an operational request; a module for sending said operational request from a server to a client system; wherein said operational request is received by a client system; wherein said operational request instructs said client system to allocate user space and system space areas on said client system's storage device; and storage allocation means on said client system for partitioning said local storage device as specified in said operational request.

Other examples of embodiments are described throughout this application.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method, comprising:
sending over one or more networks, by a server, to specific client media devices of a plurality of client media devices, messages configured to cause the specific client media devices to record specific items of media content from a variety of sources, the specific client media devices having been configured to also record additional items of media content from the variety of sources, the additional items having been explicitly selected for recording by local users of the specific client media devices, the specific client media devices further having been configured to autonomously schedule recordings of the specific items and the additional items;
receiving, at the server, data from the specific client media devices indicating when the specific items of media content are watched at the specific client media devices;
wherein the method is performed by one or more computing devices.

2. The method of claim 1, further comprising the server redistributing the specific items of media content to the plurality of client devices.

3. The method of claim 1, wherein each of the specific client media devices is a digital video recorder.

4. The method of claim 1, wherein the variety of sources include at least one cable, satellite, or broadcast sources and at least one source that transmits items of media content across a network.

5. The method of claim 1, wherein the messages are capture requests that specify the specific items to capture.

6. The method of claim 1, wherein the messages specify specific storage spaces in which the specific client media devices are to store the specific items of media content.

7. The method of claim 1, further comprising the server sending instructions to one or more of the specific client media devices to delete a particular item of media content.

8. The method of claim 1, further comprising sending messages to the specific client media devices that instruct the specific client media devices to allocate storage spaces at the specific client media devices for control of the server.

9. The method of claim 1, further comprising the server selecting, from the plurality of client media devices, which of the specific client media devices are to record which of the specific items of media content, based on data describing at least capabilities of the specific client media devices.

10. The method of claim 1, further comprising the server selecting, from the plurality of client media devices, which of the specific client media devices are to record which of the specific items of media content, based on data describing at least content already at the specific client media devices.

11. One or more non-transitory computer-readable media, storing instructions that, when executed by one or more computing devices, cause performance of:
sending over one or more networks, by a server, to specific client media devices of a plurality of client media devices, messages configured to cause the specific client media devices to record specific items of media content from a variety of sources, the specific client media devices having been configured to also record additional items of media content from the variety of sources, the additional items having been explicitly selected for recording by local users of the specific client media devices, the specific client media devices further having been configured to autonomously schedule recordings of the specific items and the additional items;
receiving, at the server, data from the specific client media devices indicating when the specific items of media content are watched at the specific client media devices.

12. The one or more non-transitory computer-readable media of claim 11, wherein the instructions, when executed by the one or more computing devices, further cause the server redistributing the specific items of media content to the plurality of client devices.

13. The one or more non-transitory computer-readable media of claim 11, wherein each of the specific client media devices is a digital video recorder.

14. The one or more non-transitory computer-readable media of claim 11, wherein the variety of sources include at least one cable, satellite, or broadcast source and at least one source that transmits items of media content across a network.

15. The one or more non-transitory computer-readable media of claim 11, wherein the messages are capture requests that specify the specific items to capture.

16. The one or more non-transitory computer-readable media of claim 11, wherein the messages specify specific storage spaces in which the specific client media devices are to store the specific items of media content.

17. The one or more non-transitory computer-readable media of claim 11, wherein the instructions, when executed by the one or more computing devices, further cause the server sending instructions to one or more of the specific client media devices to delete a particular item of media content.

18. The one or more non-transitory computer-readable media of claim 11, wherein the instructions, when executed by the one or more computing devices, further cause sending messages to the specific client media devices that instruct the specific client media devices to allocate storage spaces at the specific client media devices for control of the server.

19. The one or more non-transitory computer-readable media of claim 11, wherein the instructions, when executed by the one or more computing devices, further cause the server selecting, from the plurality of client media devices, which of the specific client media devices are to record which of the specific items of media content, based on data describing at least capabilities of the specific client media devices.

20. The one or more non-transitory computer-readable media of claim 11, wherein the instructions, when executed by the one or more computing devices, further cause the server selecting, from the plurality of client media devices, which of the specific client media devices are to record which of the specific items of media content, based on data describing at least content already at the specific client media devices.

21. A system, comprising:
a subsystem, implemented at least partially by hardware, configured to send over one or more networks, by a server, to specific client media devices of a plurality of client media devices, messages configured to cause the specific client media devices to record specific items of media content from a variety of sources, the specific client media devices having been configured to also record additional items of media content from the variety of sources, the additional items having been explicitly selected for recording by local users of the specific client media devices, the specific client media devices further having been configured to autonomously schedule recordings of the specific items and the additional items;

a subsystem, implemented at least partially by hardware, configured to receive, at the server, data from the specific client media devices indicating when the specific items of media content are watched at the specific client media devices.

22. The system of claim 21, a subsystem, implemented at least partially by hardware, configured to redistribute the specific items of media content to the plurality of client devices.

23. The system of claim 21, wherein each of the specific client media devices is a digital video recorder.

24. The system of claim 21, wherein the variety of sources include at least one cable, satellite, or broadcast source and at least one source that transmits items of media content across a network.

25. The system of claim 21, wherein the messages are capture requests that specify the specific items to capture.

26. The system of claim 21, wherein the messages specify specific storage spaces in which the specific client media devices are to store the specific items of media content.

27. The system of claim 21, further comprising a subsystem, implemented at least partially by hardware, configured to send instructions to one or more of the specific client media devices to delete a particular item of media content.

28. The system of claim 21, further comprising a subsystem, implemented at least partially by hardware, configured to send messages to the specific client media devices that instruct the specific client media devices to allocate storage spaces at the specific client media devices for control of the server.

29. The system of claim 21, further comprising a subsystem, implemented at least partially by hardware, configured to select, from the plurality of client media devices, which of the specific client media devices are to record which of the specific items of media content, based on data describing at least capabilities of the specific client media devices.

30. The system of claim 21, further comprising a subsystem, implemented at least partially by hardware, configured to select, from the plurality of client media devices, which of the specific client media devices are to record which of the specific items of media content, based on data describing at least content already at the specific client media devices.

* * * * *